US005668750A

United States Patent [19]

Kimura

[11] Patent Number: 5,668,750

[45] Date of Patent: Sep. 16, 1997

[54] BIPOLAR MULTIPLIER WITH WIDE INPUT VOLTAGE RANGE USING MULTITAIL CELL

[75] Inventor: Katsuji Kimura, Tokyo, Japan

[73] Assignee: NEC Corporation, Tokyo, Japan

[21] Appl. No.: 629,390

[22] Filed: Apr. 8, 1996

[30] Foreign Application Priority Data

Jul. 28, 1995 [JP] Japan .................................... 7-212632

[51] Int. Cl.[6] .............................. G06G 7/16; G06F 7/556

[52] U.S. Cl. .............................................. 364/841; 327/356

[58] Field of Search .................................... 364/606, 841, 364/843; 327/355, 356, 357

[56] References Cited

U.S. PATENT DOCUMENTS

| | | | |
|---|---|---|---|
| 5,357,149 | 10/1994 | Kimura | 327/512 |
| 5,438,296 | 8/1995 | Kimura | 327/560 |
| 5,485,119 | 1/1996 | Kimura | 330/253 |
| 5,521,542 | 5/1996 | Kimura | 327/352 |
| 5,578,965 | 11/1996 | Kimura | 330/254 |
| 5,581,210 | 12/1996 | Kimura | 327/355 |
| 5,581,211 | 12/1996 | Kimura | 327/356 |
| 5,583,456 | 12/1996 | Kimura | 326/115 |

OTHER PUBLICATIONS

K. Kimura, "Bipolar and MOS Four-Quadrant Analog Multipliers with the Same Transfer Curves of . . . Quadritail Cell", *Technical Report of IEICE,* CAS93-78, Nov. 1993, pp. 31-35.

K. Kimura, "A Unified Analysis of Four-Quadrant Analog Multipliers Consisting of Emitter and . . . Voltage", *IEICE Trans. Electron.,* vol. E76-C, No. 5, May 1993, pp. 714-737.

K. Kimura, "A New Bipolar Multiplier Core", *Proceedings of the Engineering Sciences at the 1994 Society Conference of IEICE* (*A-11*), p. 11.

K. Kimura, "An MOS Four-Quadrant Analog Multiplier Based on the Multitail Technique . . . Core", *IEEE Trans on Cir and Sys—I: Fund. Theory and Applns*, vol. 42, No. 8, Aug. 1995, pp. 448-454.

K. Kimura, "A Bipolar Very Low-Voltage Multiplier Core Using a Quadritail Cell", *IEICE Trans. Fundamentals,* vol. E78-A, No. 5, May 1995, pp. 560-565.

*Primary Examiner*—Chuong D. Ngo
*Attorney, Agent, or Firm*—Sughrue, Mion, Zinn, Macpeak and Seas

[57] ABSTRACT

A bipolar four-quadrant analog multiplier that is formed on a semiconductor integrated circuit device and is capable of low-voltage operation at a voltage as low as 1 V while the input voltage range providing a good linearity is enlarged. This multiplier contains a multitail cell made of a first transistor pair of first and second bipolar transistors, a second transistor pair of third and fourth bipolar transistors, and at least one bipolar transistor. The first and second transistors have output ends coupled together to form one of differential output ends of the multiplier. The third and fourth transistors have output ends coupled together to form the other of the differential output ends. The first to fifth transistors are driven by a common tail current. The first, second, third, fourth and fifth transistors are applied with $(aV_x+bV_y)$, $[(a-1)V_x+(b-1)V_y]$, $[(a-1)V_x+bV_y]$, $[aV_x+(b-1)V_y]$, and $[\{a-(½)\}V_x+\{b-(½)\}V_y+V_c]$, respectively, where $V_x$ and $V_y$ are initial input signals to be multiplied, a and b are constants, and $V_c$ is a positive dc voltage.

29 Claims, 32 Drawing Sheets

(Vc=35mV)

BIPOLAR MULTIPLIER WITH WIDE INPUT VOLTAGE RANGE USING MULTITAIL CELL

BACKGROUND OF THE INVENTION

1. Field of the Invention

The present invention relates to an analog multiplier and more particularly, to a bipolar analog multiplier for multiplication of two analog signals that is formed on a semiconductor integrated circuit device and that can operate at a low voltage while enlarging the input voltage range providing a good linearity.

2. Description of the Prior Art

Conventionally, three types of bipolar multipliers were developed, analyzed and published by the inventor, K. Kimura. The first of them appeared in IEICE Paper of Technical Group on Circuits and Systems (CAS93-78), pp. 31–35, the second in the IEICE Transactions on Electronics, Vol. E76-C, No. 5, pp. 714–737 (pp. 735–736), and the third in Proceedings of the Engineering Sciences at the 1994 Society Conference of IEICE (A-11).

The conventional MOS multiplier disclosed in the above IEICE Paper of Technical Group on Circuits and Systems (CAS93-78) was further disclosed by K. Kimura, in IEEE Transactions on Circuits and Systems-I, Vol. 42, No. 8, pp. 448–454, August 1995, entitled "An MOS Four-Quadrant Analog Multiplier Based on the Multitail Technique Using a Quadritail Cell as a Multiplier Core". The conventional bipolar multiplier disclosed in the above IEICE Paper of Technical Group on Circuits and Systems (CAS93-78) was further disclosed by K. Kimura, in IEICE Transactions on Fundamentals, Vol. E78-A, No. 5, pp. 560–565, May 1995, entitled "A Bipolar Very Low-Voltage Multiplier Core Using a Quadritail Cell".

The inventor, K. Kimura, termed a circuit made of three or more transistors driven by a single (common) tail current a "multitail cell", and when the number of transistors is four, the circuit is termed a "quadritail cell".

These conventional multipliers will be described below. FIG. 1 shows a typical or basic configuration of the conventional bipolar multipliers.

In FIG. 1, the conventional multiplier has a quadritail circuit formed of four npn-type bipolar transistors Q51, Q52, Q53 and Q54 and a constant current source 51 (current value: $I_0$) for driving the quadritail circuit. The transistors Q51, Q52, Q53 and Q54 have the same emitter area.

Emitters of the transistors Q51, Q52, Q53 and Q54 are coupled together. The constant current source 1 is connected between these coupled emitters and the ground. Collectors of the transistors Q51 and Q52 are coupled together. Collectors of the transistors Q53 and Q54 are coupled together.

Bases of the transistors Q51, Q52, Q53 and Q54 are applied with four input voltages $V_1$, $V_2$, $V_3$ and $V_4$, respectively. An output current $I_L$ is outputted from the coupled collectors of the transistors Q51 and Q52. Another output current $I_R$ is outputted from the coupled collectors of the transistors Q53 and Q54. A differential output current ΔI of the multiplier is defined as $\Delta I = I_L - I_R$.

In the multiplier of FIG. 1, if the relationship between the collector current the base-to-emitter voltage varies dependent on the exponent-law characteristic, the collector current $I_{ci}$ of the i-th transistor is expressed as the following equation (1), where $I_s$ is the saturation current, $V_{BEi}$ is the base-to-emitter voltage of the i-th transistor, and $V_T$ is the thermal voltage.

$$I_{Ci} = I_S\left\{\exp\left(\frac{V_{BEi}}{V_T}\right) - 1\right\} \tag{1}$$

The thermal voltage $V_T$ is expressed as $V_T=(kT)/q$ where k is Boltzmann's constant, T is absolute temperature in degrees Kelvin and q is the charge of an electron.

In the equation (1), if $V_{BE}$ is about 600 mV, the exponential term "$\exp(V_{BE}/V_T)$" has a value in the order of $e^{10}$, and therefore, the term "−1" can be neglected. As a result, the equation (1) can be approximated as the following equation (2).

$$I_{C1} = I_S\exp\left(\frac{V_{BEi}}{V_T}\right) \tag{2}$$

Then, assuming that all the transistors Q51, Q52, Q53 and Q54 are matched in characteristic, the collector currents of the transistors Q51, Q52, Q53 and Q54 driven by the tail current $I_0$ are expressed as the following equations (3), (4), (5) and (6), respectively, where $V_R$ is the dc voltage of the input signals and $V_E$ is the common emitter voltage.

$$I_{C1} = I_S\exp\left(\frac{V_1 + V_R - V_E}{V_T}\right) \tag{3}$$

$$I_{C2} = I_S\exp\left(\frac{V_2 + V_R - V_E}{V_T}\right) \tag{4}$$

$$I_{C3} = I_S\exp\left(\frac{V_3 + V_R - V_E}{V_T}\right) \tag{5}$$

$$I_{C4} = I_S\exp\left(\frac{V_4 + V_R - V_E}{V_T}\right) \tag{6}$$

Since the quadritail circuit in FIG. 1 is driven by the common tail current $I_0$, the following equation (7) needs to be satisfied additionally, where $\alpha_F$ is the dc common-base current gain factor.

$$I_{C1}+I_{C2}+I_{C3}+I_{C4}=\alpha_F I_0 \tag{7}$$

Solving the equations (3), (4), (5), (6) and (7) provides the following equation (8).

$$I_S\exp\left(\frac{V_R - V_E}{V_T}\right) = \frac{\alpha_F I_0}{\left\{\exp\left(\frac{V_1}{V_T}\right)+\exp\left(\frac{V_2}{V_T}\right)+\exp\left(\frac{V_3}{V_T}\right)+\exp\left(\frac{V_4}{V_T}\right)\right\}} \tag{8}$$

The differential output current ΔI is expressed as the following equation (9).

$$\Delta I = (I_{C1}+I_{C2})-(I_{C3}+I_{C4}) = \frac{\alpha_F I_0\left\{\exp\left(\frac{V_1}{V_T}\right)+\exp\left(\frac{V_2}{V_T}\right)-\exp\left(\frac{V_3}{V_T}\right)-\exp\left(\frac{V_4}{V_T}\right)\right\}}{\left\{\exp\left(\frac{V_1}{V_T}\right)+\exp\left(\frac{V_2}{V_T}\right)+\exp\left(\frac{V_3}{V_T}\right)+\exp\left(\frac{V_4}{V_T}\right)\right\}} \quad (9)$$

It is seen from the equation (9) that the input voltages $V_1$, $V_2$, $V_3$ and $V_4$ needs to be adaptively decided in order to obtain the product of the input voltages in the differential output current ΔI.

FIG. 2 shows an example of the conventional bipolar multiplier of FIG. 1, in which the input voltages $V_1$, $V_2$, $V_3$ and $V_4$ are adaptively set to linearire the differential output current ΔI.

In the conventional multiplier of FIG. 2, a base of the transistor Q51 is applied with an input voltage $(½)(V_x+V_y)$ with regard to a reference point. A base of the transistor Q52 is applied with an input voltage $(-½)(V_x+V_y)$ with regard to the reference point. A base of the transistor Q53 is applied with an input voltage $(½)(V_x-V_y)$ with regard to the reference point. A base of the transistor Q54 is applied with an input voltage $(-½)(V_x-V_y)$ with regard to the reference point.

In the conventional multiplier of FIG. 2, since $V_1=(½)(V_x+V_y)$, $V_2=(-½)(V_x+V_y)$, $V_3=(½)(V_x-V_y)$, and $V_4=(-½)(V_x-V_y)$. Therefore, by substituting these into the equation (9), the differential output current ΔI is expressed as the following equation (10).

$$\Delta I = \alpha_F I_0 \tanh\left(\frac{V_x}{2V_T}\right)\tanh\left(\frac{V_y}{2V_T}\right) \quad (10)$$

FIG. 3 shows another example of the conventional bipolar multiplier of FIG. 1, in which the input voltages $V_1$, $V_2$, $V_3$ and $V_4$ are adaptively set to linearize the differential output current ΔI.

In this multiplier of FIG. 3, a base of the transistor Q51 is applied with an input voltage $(½)V_x$ with regard to a reference point (voltage: $V_R$). A base of the transistor Q52 is applied with an input voltage $[(-½)V_x-V_y]$ with regard to the reference point. A base of the transistor Q53 is applied with an input voltage $[(½)V_x-V_y]$ with regard to the reference point. A base of the transistor Q54 is applied with an input voltage $(-½)V_x$ with regard to the reference point.

In the conventional muitiplier core circuit of FIG. 3, since $V_1=(½)V_x$, $V_2=(-½)V_x-V_y$, $V_3=(½)V_x-V_y$, and $V_4=(-½)V_x$, and therefore, the differential output current ΔI is expressed as the following equation (11) from the equation (9).

$$\Delta I = \alpha_F I_0 \tanh\left(\frac{V_x}{2V_T}\right)\tanh\left(\frac{V_y}{2V_T}\right) \quad (11)$$

FIG. 4 shows further example of the conventional bipolar multiplier of FIG. 1, in which the input voltages $V_1$, $V_2$, $V_3$ and $V_4$ are adaptively set to linearize the differential output current ΔI.

In this multiplier of FIG. 4, a base of the transistor Q51 is applied with an input voltage $(V_x+V_y)$ with regard to a reference point. A base of the transistor Q52 is applied with an input voltage 0 (zero) with regard to the reference point. A base of the transistor Q53 is applied with an input voltage $V_x$ with regard to the reference point. A base of the transistor Q54 is applied with an input voltage $V_y$ with regard to the reference point.

In the conventional multiplier core circuit of FIG. 4, since $V_1=V_x+V_y$, $V_2=0$, $V_3=V_x$, and $V_4=V_y$, and therefore, the differential output current ΔI is expressed as the following equation (12) from the equation (9).

$$\Delta I = \alpha_F I_0 \tanh\left(\frac{V_x}{2V_T}\right)\tanh\left(\frac{V_y}{2V_T}\right) \quad (12)$$

Thus, the equation (12) is the same as the equations (10) and (11).

FIG. 5 shows the input/output (or transfer) characteristic of the conventional multipliers of FIGS. 2, 3 and 4, and FIG. 6 shows the corresponding transconductance characteristic.

The right-hand side of the equation (10), (11) or (12) multiplied by $\alpha_F$ is equal to the differential output current of the well-known Gilbert multiplier cell.

An obtainable value of $\alpha_F$ through the typical bipolar processes is in the range from 0.98 to 0.99, which is extremely near 1. Therefore, it is seen from the equations (10), (11) and (12) that the conventional multipliers of FIGS. 2, 3 and 4 have the transfer characteristics approximately equal to that of the Gilbert multiplier cell.

Also, since the conventional multipliers of FIGS. 2, 3 and 4 do not contain the transistors stacked as in the Gilbert's one, they can operate at a lower voltage than the Gilbert's one.

The Gilbert multiplier cell can be linearized by incorporating the Gilbert gain cell, which is a well-known linearized circuit, in the input circuit, and the circuit thus created has originally been called the Gilbert multiplier.

The multiplier is an essential function block in analog signal processing. With the process of signal processing having become finer, the power supply voltage for LSIs has been decreased from 5 V to 3 V, or as low as 2 or 1 V, thus, a more advanced low-voltage circuit technology is increasingly been required. Such the conventional multipliers can originally be operated at a low voltage, however, as stated above, they have an input voltage range as narrow as that for the Gilbert multiplier cell. This causes a problem that only an extremely narrow range can be provided as a linear input voltage range.

SUMMARY OF THE INVENTION

Accordingly, an object of the present invention is to provide a bipolar multiplier that can operate at a voltage as low as 1 V while enlarging the input voltage range providing a good linearity.

A bipolar multiplier according to a first aspect of the present invention has a multitail cell made of a first transistor pair of first and second bipolar transistors whose output ends are coupled together, a second transistor pair of third and fourth bipolar transistors whose outputs ends are coupled together, and a fifth bipolar transistor, which are driven by a common tail current.

The coupled output ends of the first and second transistors form one of differential output ends of the multiplier. The coupled output ends of the third and fourth transistors form the other of the differential output ends.

When a first initial input signal and a second initial input signal to be multiplied are $V_x$ and $V_y$, respectively, input ends of the first, second, third, and fourth transistors are applied with input signals of $(aV_x+bV_y)$, $\{(a-1)V_x+(b-1)V_y\}$, $\{(a-1)V_x+bVy\}$, and $\{(aV_x+(b-1)V_y\}$, respectively, where a and b are constants.

An input end of the fifth transistor is applied with an input signal of $\{(a-½)V_x+(b-½)V_y+V_c\}$, where $V_c$ is a positive dc voltage.

In a preferred embodiment of the first aspect, the value of the positive dc voltage $V_c$ is equal to $(V_T \cdot ln2)$, where $V_T$ is the thermal voltage.

In another preferred embodiment of the first aspect, the constants a and b satisfy the relationships of (a−1) >0 and (b−1)>0.

In still another preferred embodiment of the first aspect, the constants a and b are set as a=1 and b=1.

In a further preferred embodiment of the first aspect, the input signals applied to the first, second, third, fourth and fifth transistors are produced by using resistive dividers, respectively.

A bipolar multiplier according to a second aspect of the present invention has a multitail cell made of a first transistor pair of first and second bipolar transistors whose output ends are coupled together, a second transistor pair of third and fourth bipolar transistors whose outputs ends are coupled together, and fifth to ninth bipolar transistors, which are driven by a common tail current.

The multiplier according to the second aspect is equivalent to one composed of the multiplier according to the first aspect and newly added sixth to ninth bipolar transistors.

Here, the dc voltage $V_c$ applied to the fifth bipolar transistor is set as $(4V_T \cdot ln2)$ and therefore, the input signal applied to the fifth transistor is $[\{a-(½)\}V_x+\{b-(½)\}V_y+4V_T \cdot ln2]$.

The input signals applied respectively to the sixth to ninth bipolar transistors are $[aV_x+\{b-(½)\}V_y+2V_T \cdot ln2]$, $[(a-1)V_x+\{b-(½)\}V_y+2V_T \cdot ln2]$, $[\{a-(½)\}V_x+bV_y+2V_T \cdot ln2]$, and $[\{a-(½)\}V_x+(b-1)V_y+2V_T \cdot ln2]$, respectively.

In a preferred embodiment of the second aspect, the constants a and b satisfy the relationships of (a−1)>0 and (b−1)>0. In this case, the input signals applied to the first to ninth transistors can be produced by using resistive dividers, respectively.

In another preferred embodiment of the second aspect, the constants a and b are set as a=1 and b=1. In this case, the input voltages are simplified.

A bipolar multiplier according to a third aspect of the present invention has a multitail cell made of a first transistor pair of first and second bipolar transistors whose output ends are coupled together, a second transistor pair of third and fourth bipolar transistors whose outputs ends are coupled together, and fifth to sixteenth bipolar transistors, which are driven by a common tail current.

The multiplier according to the third aspect is equivalent to one composed of the multiplier according to the first aspect and newly added sixth to sixteenth bipolar transistors.

The input signals applied respectively to the fifth to sixteenth bipolar transistors are;

| | |
|---|---|
| (fifth) | $[aV_x + \{b - (½) (1 - 5^{-½}) \}V_y + V_c]$, |
| (sixth) | $[(a - 1)V_x + \{b - (½) (1 - 5^{-½}) \} V_y + V_c]$, |
| (seventh) | $[\{a - (½) (1 - 5^{-½}) \}V_x + bV_y + V_c]$, |
| (eighth) | $[\{a - (½) (1 - 5^{-½}) \}V_x + (b - 1)V_y + V_c]$, |
| (ninth) | $[\{a - (½) (1 - 5^{-½}) \}V_x + \{b - (½) (1 - 5^{-½}) \}V_y + 2V_c]$, |
| (tenth) | $[\{a - (½) (1 + 5^{-½}) \}V_x + \{b - (½) (1 + 5^{-½}) )Vy + 2V_c]$, |
| (eleventh) | $[\{a - (½) (1 - 5^{-½}) \}V_x + \{b - (½) (1 + 5^{-1/2}) \}Vy + 2V_c]$, |
| (twelfth) | $[\{a - (½) (1 - 5^{-½}) (1 - 5^{-½}) \}Vy + 2V_c]$, |
| (thirteenth) | $[aV_{x + \{b - (½) (1 + 5}{}^{-½})V_y + V_c]$, |
| (fourteenth) | $[(a - 1)V_x + \{b - (½) (1 - 5^{-½}) )V_y + V_c]$, |
| (fifteenth) | $[\{a - (½) (1 + 5^{-½}) \}Vx + (b - 1)V_y + V_c]$, |
| (sixteenth) | $[\{a - (½) (1 + 5^{-½}) )V_x + bV_y + V_c]$, |
| respectively. | |

In a preferred embodiment of the third aspect, the value of the positive dc voltage $V_c$ is equal to $(V_T \cdot ln5)$.

In another preferred embodiment of the third aspect, the constants a and b satisfy the relationships of (a−1)>0, (b−1)>0, $\{a-(½)(1+5^{-½})\}>0$, end $\{b-(½)(1+5^{-½})\}>0$.

In still another preferred embodiment of the third aspect, the constants a and b are set as a=1 and b=1.

In a further preferred embodiment of the third aspect, the input signals applied to the first to sixteenth transistors are produced by using resistive dividers, respectively.

A bipolar multiplier according to a fourth aspect of the present invention has a multitail cell made of a first transistor pair of first and second bipolar transistors whose output ends are coupled together, a second transistor pair of third and fourth bipolar transistors whose outputs ends are coupled together, and fifth and sixth bipolar transistors, which are driven by a common tail current.

The coupled output ends of the first and second transistors form one of differential output ends of the multiplier. The coupled output ends of the third and fourth transistors form the other of the differential output ends.

The multiplier according to the fourth aspect is equivalent to one composed of the multiplier according to the first aspect and newly added sixth bipolar transistor.

The first, second, third, and fourth transistors are applied with the same input signals as those of the first aspect.

The fifth and sixth transistors are applied with the signals of $\{(a-½)V_x+bV_y+2V_C\}$, and $\{(a-½)V_x+(b-1)V_y+2V_c\}$, respectively.

In a preferred embodiment of the fourth aspect, the value of the positive dc voltage $V_c$ is equal to $(V_T \cdot ln2)$, where $V_T$ is the thermal voltage.

In another preferred embodiment of the fourth aspect, the constants a and b satisfy the relationships of (a−1)>0 and (b−1)>0. In this case, the input signals applied to the first, second, third, fourth and fifth transistors can be produced by using resistive dividers, respectively.

In still another preferred embodiment of the fourth aspect, the constants a and b are set as a=1 and b=1.

A bipolar multiplier according to a fifth aspect of the present invention has a multitail cell made of a first transistor pair of first and second bipolar transistors whose output ends are coupled together, a second transistor pair of third and fourth bipolar transistors whose outputs ends are coupled together, and fifth to eighth bipolar transistors, which are driven by a common tail current.

The multiplier according to the fifth aspect is equivalent to one composed of the multiplier according to the first aspect and newly added sixth to eighth bipolar transistors.

The input signals applied respectively to the fifth to eighth bipolar transistors are (fifth) $[aV_x+\{b-(1/2)(1-5^{-1/2})V_y\}+V_c]$, (sixth) $[(a-1)V_x+\{b-(1/2)(1-5^{-1/2})V_y\}+V_c]$, (seventh) $[\{a-(1/2)(1-5^{-1/2})\}V_x+(b-1)V_y+V_c]$, and (eighth) $[\{a-(1/2)(1-5^{-1/2})\}V_x+bV_y+V_c]$.

In a preferred embodiment of the fifth aspect, the value of the positive dc voltage $V_c$ is equal to $(V_T \cdot \ln 5)$.

In another preferred embodiment of the fifth aspect, the constants a and b satisfy the relationships of $(a-1)>0$, $(b-1)>0$, $\{a-(1/2)(1-5^{-1/2})\}>0$, and $\{b-(1/2)(1-5^{-1/2})\}>0$, respectively. In this case, the input signals applied to the first to eighth transistors can be produced by using resistive dividers, respectively.

In still another preferred embodiment of the fifth aspect, the constants a and b are set as a=1 and b=1.

A bipolar multiplier according to a sixth aspect of the present invention has a multitail cell made of a first transistor pair of first and second bipolar transistors whose output ends are coupled together, a second transistor pair of third and fourth bipolar transistors whose outputs ends are coupled together, and fifth to twelfth bipolar transistors, which are driven by a common tail current.

The multiplier according to the sixth aspect is equivalent to one composed of the multiplier according to the first aspect and newly added sixth to twelfth bipolar transistors.

The input signals applied respectively to the fifth to eighth bipolar transistors are (fifth) $[\{a-(1/2)(1-5^{-1/2})\}V_x+bV_y+V_{c2}]$ ($V_{c2}$ is a positive dc voltage)

(sixth) $[\{a-(1/2)(1-5^{-1/2})\}V_x+\{b-1\}V_y+V_{c2}]$, (seventh) $[aV_x+\{b-(1/2)\}V_y+V_{c1}]$ ($V_{c1}$ is a positive dc voltage), (eighth) $[(a-1)V_x+\{b-(1/2)\}V_y+V_{c1}]$;

(ninth) $[\{a-(1/2)(1-5^{-1/2})\}V_x+\{b-(1/2)\}V_y+V_{c3}]$ ($V_{c3}$ is a positive dc voltage), (tenth) $[\{a-(1/2)(1+5^{-1/2})\}V_x+\{b-(1/2)\}V_y+V_{c3}]$;

(eleventh) $[\{a-(1/2)(1+5^{-1/2})\}V_x+\{b-(1/2)\}V_y+V_{c3}]$, and (twelfth) $[\{a-(1/2)(1+5^{-2/1})\}V_x+bV_y+V_{c2}]$.

In a preferred embodiment of the sixth aspect, the values of the positive dc voltages $V_{C1}$, $V_{C2}$ and $V_{C3}$ are equal to $(V_T \cdot \ln 2)$, $(V_T \cdot \ln 5)$ and $(V_T \cdot \ln 20)$, respectively.

In another preferred embodiment of the sixth aspect, the constants a and b satisfy the relationships of $(a-1)>0$, $(b-1)>0$, and $\{a-(1/2)(1+5^{-1/2})\}>0$, respectively. In this case, the input signals applied to the first to twelfth transistors can be produced by using resistive dividers, respectively.

In still another preferred embodiment of the sixth aspect, the constants a and b are set as a=1 and b=1.

With the bipolar multipliers according to the first to sixth aspects of the present invention, each of the bipolar multipliers contains, as a basic structural unit, a multitail cell made of the first and second transistor pairs of bipolar transistors whose output ends are coupled together to thereby form a differential output pair, and at least one bipolar transistor, which are driven by a common tail current.

Further, the first and second bipolar transistors forming the first transistor pair and the third and fourth bipolar transistors forming the second transistor pair are respectively applied with specified input signals determined on the basis of the first initial input signal $V_x$ and the second initial input signal $V_y$ to be multiplied.

Since the polarity and magnitude of these specified input signals are appropriately determined, each of the multipliers enables to realize both an enlarged input voltage range with a good linearity and low-voltage operation at a voltage as low as 1 V.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Preferred embodiments of the present invention will be described below referring to FIGS. 7 to 36.

FIRST EMBODIMENT

Figure 7:
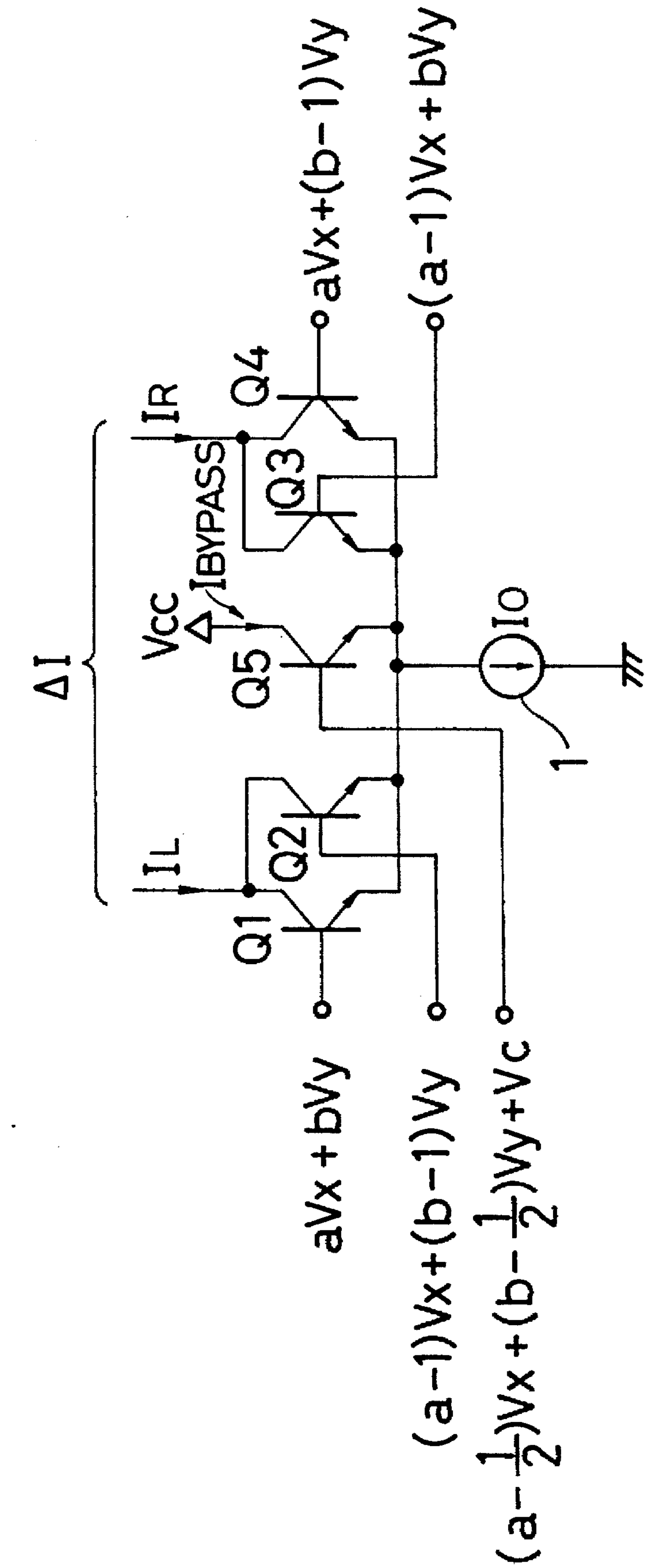
FIG. 7 is a circuit-diagram of a bipolar multiplier according to a first embodiment of the present invention.

A four-quadrant bipolar multiplier according to a first embodiment of the present invention is shown in FIG. 7.

As shown in FIG. 7, this multiplier has a multitail cell made of a first transistor pair of npn-type bipolar transistors Q1 and Q2, a second transistor pair of npn-type bipolar transistors Q3 and Q4, and an npn-type bipolar transistor Q5. The transistors Q1, Q2, Q3, Q4 and Q5 have the same emitter area. This multiplier is of a symmetrical input type.

Here, the multitail cell includes five transistors Q1, Q2, Q3, Q4 and Q5 and therefore, it may be termed a "quint-tail cell".

Emitters of the transistors Q1, Q2, 03, Q4 and Q5 are coupled together to be connected to one end of a constant current source 1 (current value: $I_0$). The other end of the current source 1 is connected to the ground. The multitail cell is driven by a common tail current $I_0$ from the current source 1.

Collectors (or output ends) of the transistors Q1 and Q2 are coupled together to form one of differential output ends of the multiplier. Collectors of the transistors Q3 and Q4 also are coupled together to form the other of the differential output ends of the multiplier.

A differential output current ΔI of this multiplier is defined as $\Delta I = I_L - I_R$, where $I_L$ is an output current of the first transistor pair and $I_R$ is an output current of the second transistor pair.

A collector of the transistor Q5 is applied with a supply voltage $V_{cc}$.

Here, a first initial input signal voltage and a second initial input signal voltage to be multiplied are defined as $V_x$ and $V_y$, respectively.

Bases (or input ends) of the transistors Q1, Q2, Q3 and Q4 are respectively applied with the first, second, third, fourth and fifth input signal voltages $V_1$, $V_2$, $V_3$, $V_4$ and $V_5$ as $V_1=(aV_x+bV_y)$, $V_2=\{(a-1)V_x+(b-1)V_y\}$, $V_3=\{(a-1)V_x+bV_y\}$, and $V_4=\{aV_x+(b-1)V_y\}$, and $V_5=\{(a-½)V_x+(b-½)V_y+V_c\}$, where a and b are constants and $V_c$ is a positive dc voltage.

Collector currents $I_{ci}$ (i=1 to 5) of these five bipolar transistors Q1, Q2, Q3, Q4 and Q5 are expressed by the following equations (13) to (17), respectively, where $V_E$ is the common emitter voltage.

$$I_{C1} = I_S \exp\left(\frac{aV_x + bV_y + V_R - V_E}{V_T}\right) \tag{13}$$

$$I_{C2} = I_S \exp\left\{\frac{(a-1)V_x + (b-1)V_y + V_R - V_E}{V_T}\right\} \tag{14}$$

$$I_{C3} = I_S \exp\left\{\frac{aV_x + (b-1)V_y + V_R - V_E}{V_T}\right\} \tag{15}$$

$$I_{C4} = I_S \exp\left\{\frac{(a-1)V_x + bV_y + V_R - V_E}{V_T}\right\} \tag{16}$$

$$I_{C5} = I_S \exp\left\{\frac{\left(a-\frac{1}{2}\right)V_x + \left(b-\frac{1}{2}\right)V_y + V_R - V_E + V_C}{V_T}\right\} \tag{17}$$

From the relationship of the tail current $I_0$ and the collector currents $I_{ci}$, the following equation (18) is obtained.

$$I_{C1}+I_{C2}+I_{C3}+I_{C4}+I_{C5}=\alpha_F I_0 \tag{18}$$

By solving the equation (13) to (17), the differential output current ΔI of the bipolar multiplier can be expressed as the following equation (19), where $K=\exp(V_C/V_T)$.

$$\Delta I=\frac{\alpha_F I_0 \sinh\left(\frac{V_x}{2V_T}\right)\sinh\left(\frac{V_y}{2V_T}\right)}{\cosh\left(\frac{V_x}{2V_T}\right)\cosh\left(\frac{V_y}{2V_T}\right)+K} \tag{19}$$

Figure 8:
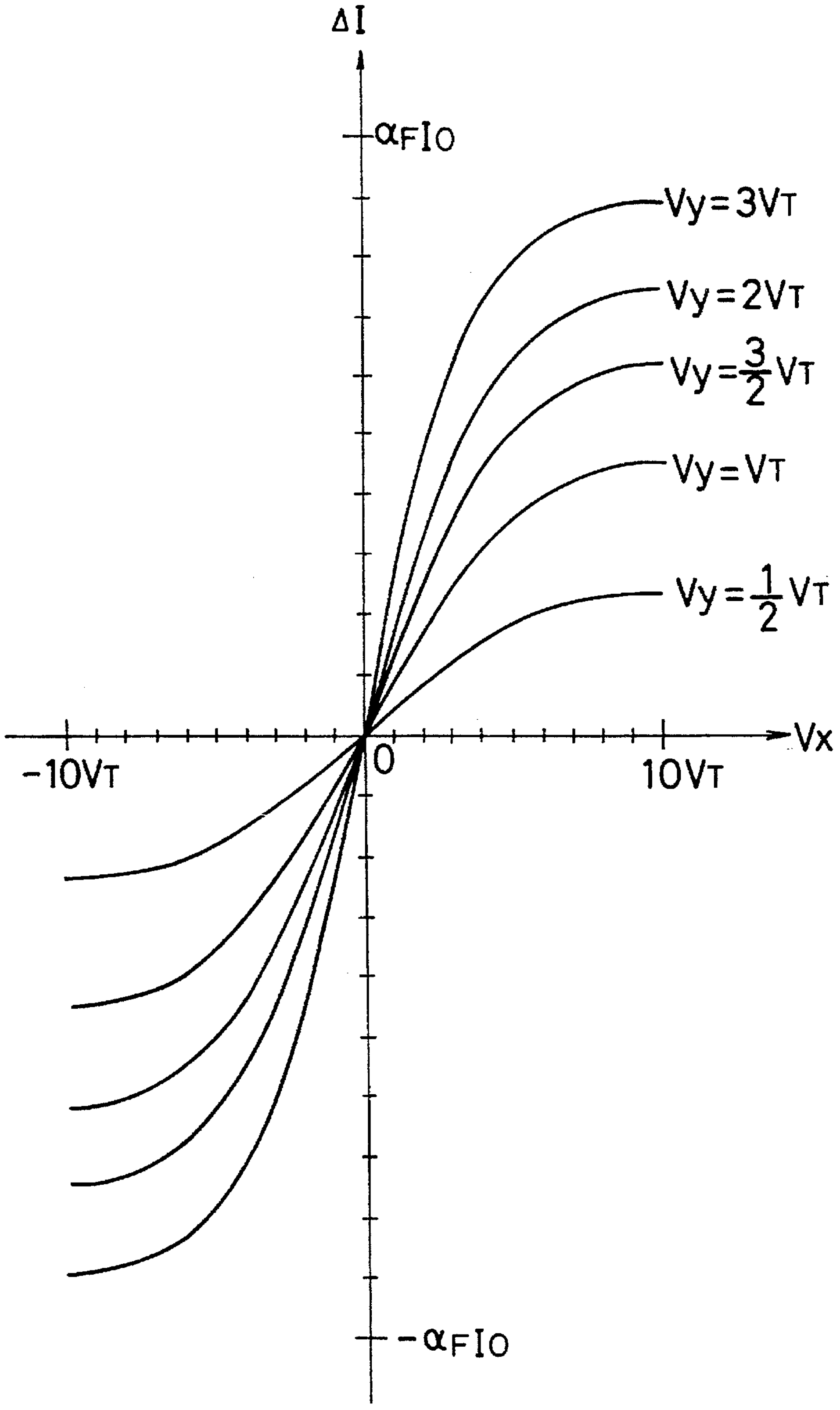
FIG. 8 is a graph showing the transfer characteristic of the multiplier according to the first embodiment.

If no ripples are to be produced independently of the value of $V_y$, the value of K can be set as 2, so that the maximum flatness is provided at $V_x$=0 when $V_y$=0. FIG. 8 shows a transfer (input/output) characteristic of the multiplier when K=2.

The transconductance characteristic can be expressed by the following equation (20), which is obtained by differentiating the ΔI by $V_x$.

$$\frac{d(\Delta I)}{dV_X}=\frac{\alpha_F I_0}{2V_T}\left[\frac{\left\{K\cosh\left(\frac{V_x}{2V_T}\right)+\cosh\left(\frac{V_y}{2V_T}\right)\right\}\sinh\left(\frac{V_y}{2V_T}\right)}{\left\{\cosh\left(\frac{V_x}{2V_T}\right)\cosh\left(\frac{V_y}{2V_T}\right)+K\right\}^2}\right] \tag{20}$$

Figure 9:
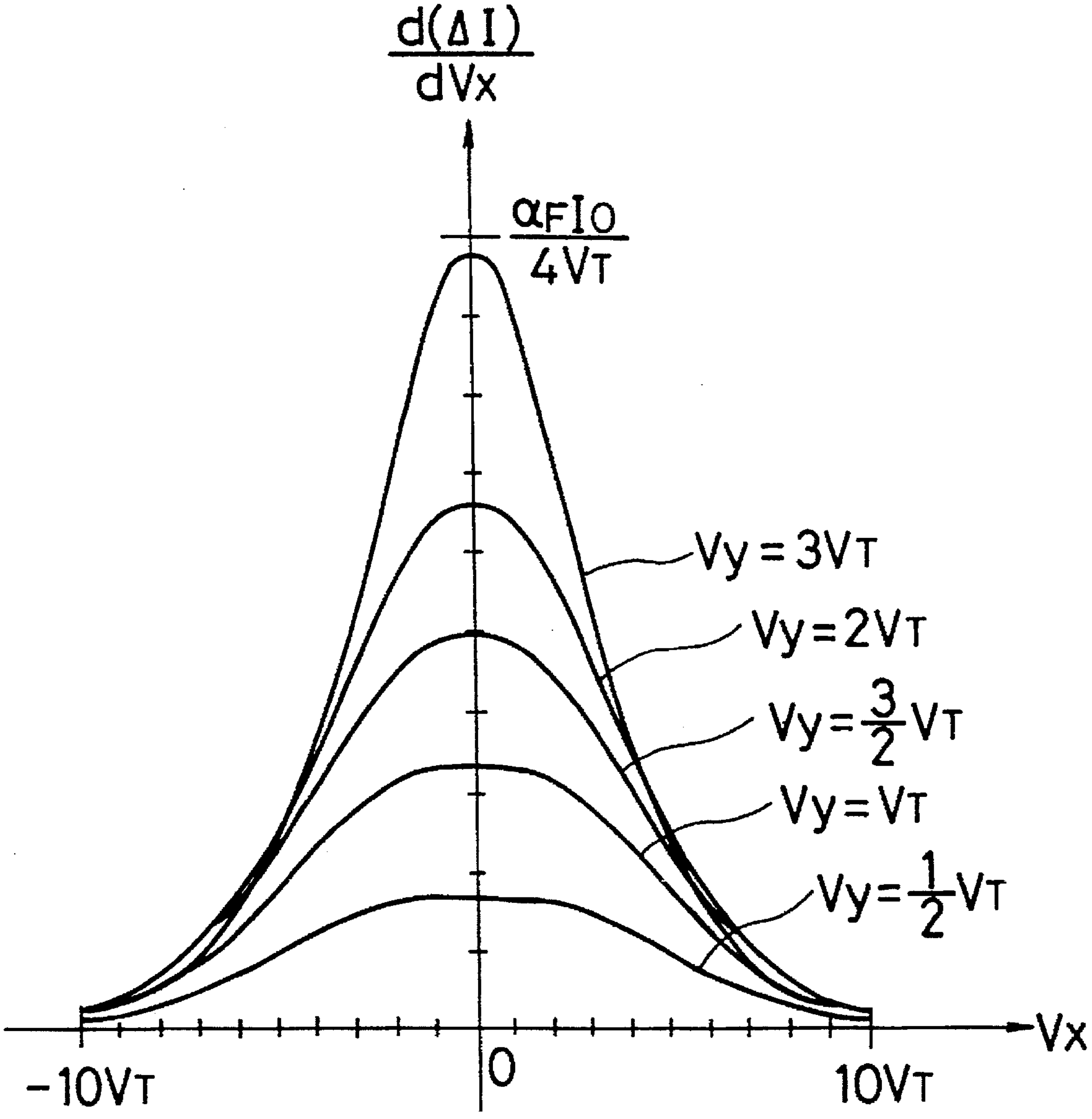
FIG. 9 is a graph showing the transconductance characteristic of the multiplier according to the first embodiment.

FIG. 9 shows the calculated values of the transconductance characteristic when K=2. In this case, the collector current $I_{c5}$ bypassed for linearization can be expressed by the following equation (21) as $$I_{BYPASS}=I_{C5}=\frac{K\alpha_F I_0}{\cosh\left(\frac{V_x}{2V_T}\right)\cosh\left(\frac{V_y}{2V_T}\right)+K} \tag{21}$$

Figure 10:
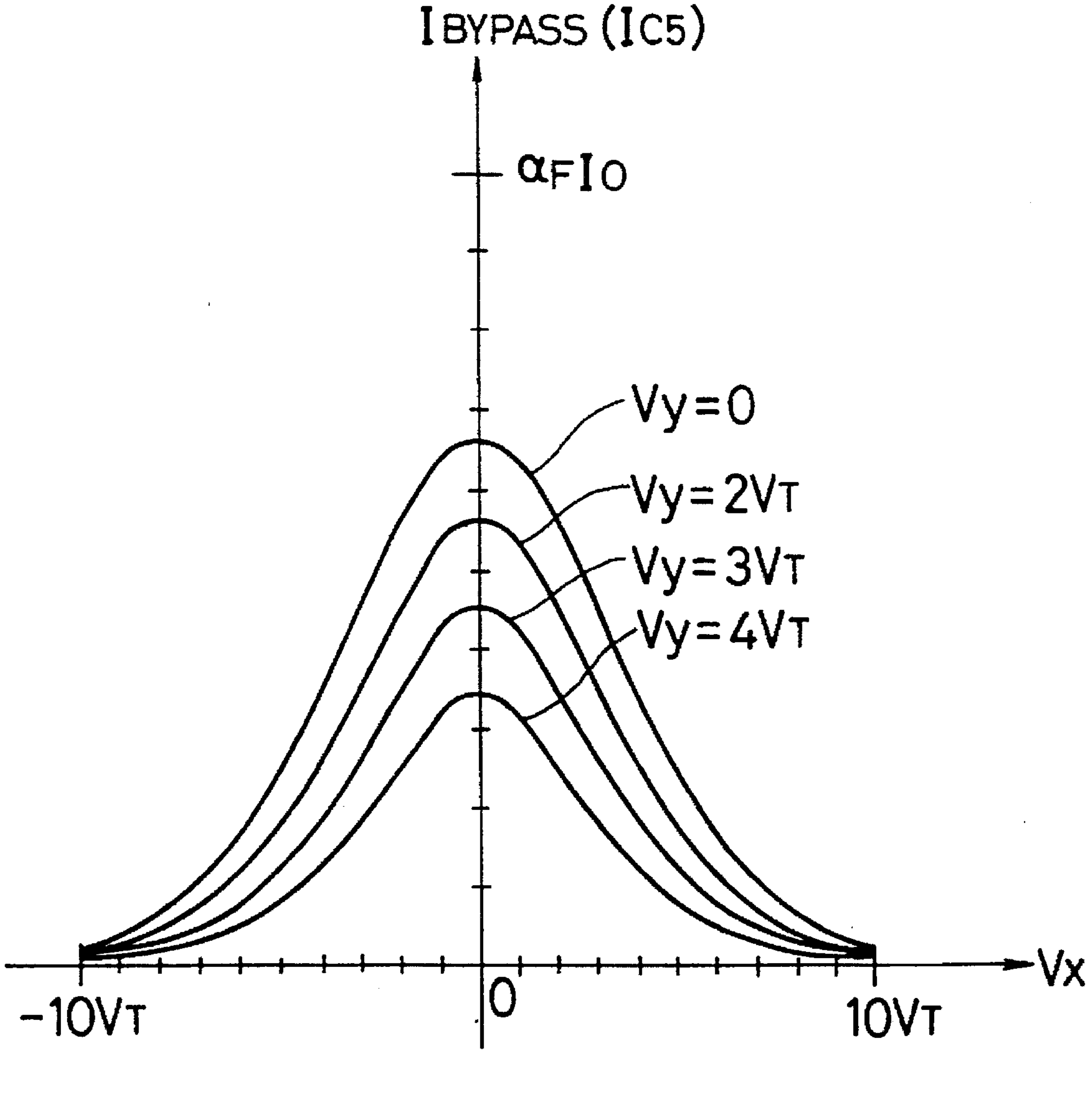
FIG. 10 is graph showing the bypass current characteristic of the multiplier according to the first embodiment.

FIG. 10 shows a characteristic of the current $I_{BYPASS}$ bypassed by the transistor Q5 in the multitail cell. In this case, the transconductance characteristic of $I_{BYPASS}$ can be expressed by the following equation (22) as $$\frac{dI_{BYPASS}}{dV_x}=-\frac{K\alpha_F I_0}{2V_T}\,\frac{\sinh\left(\frac{V_x}{2V_T}\right)}{\left\{\cosh\left(\frac{V_y}{2V_T}\right)\cosh\left(\frac{V_x}{2V_T}\right)+K\right\}^2} \tag{22}$$

Figure 1:
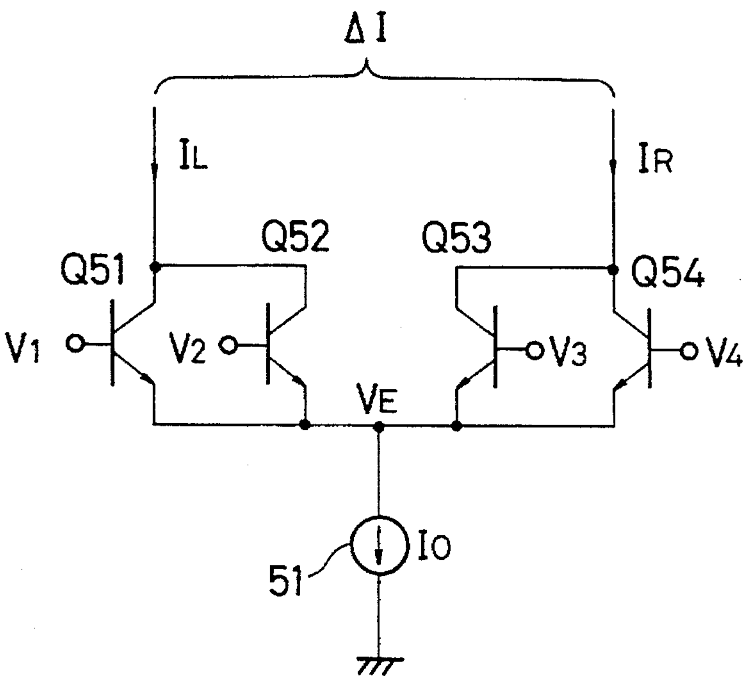
FIG.1 PRIOR ART
FIG. 1 is a circuit diagram showing a basic or typical configuration of a conventional bipolar multiplier.
Figure 2:
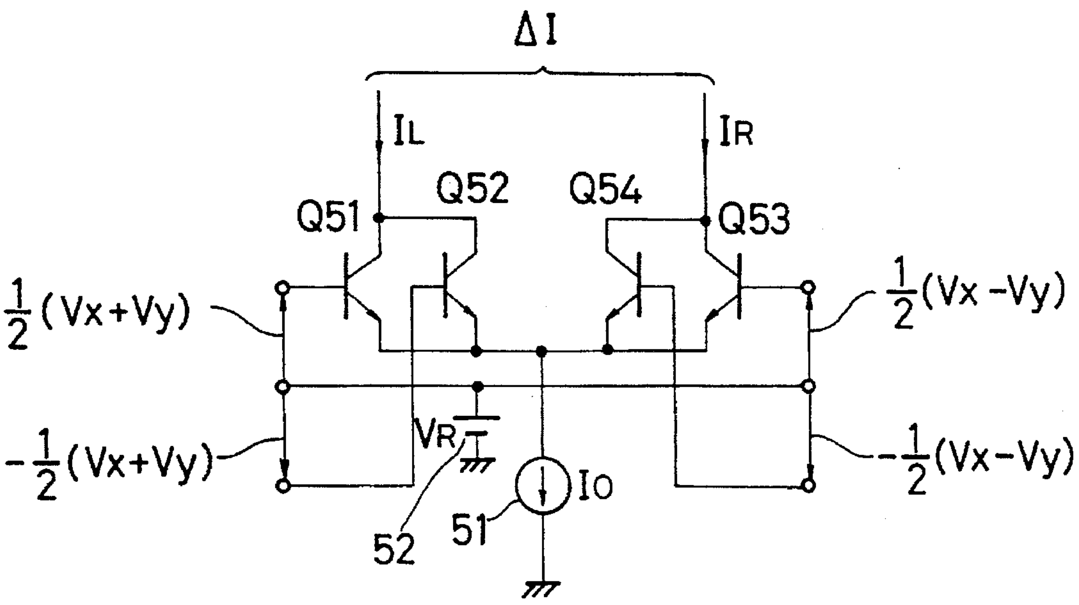
FIG.2 PRIOR ART
FIG. 2 is a circuit diagram showing a first example of the conventional bipolar multiplier of FIG. 1.
Figure 3:
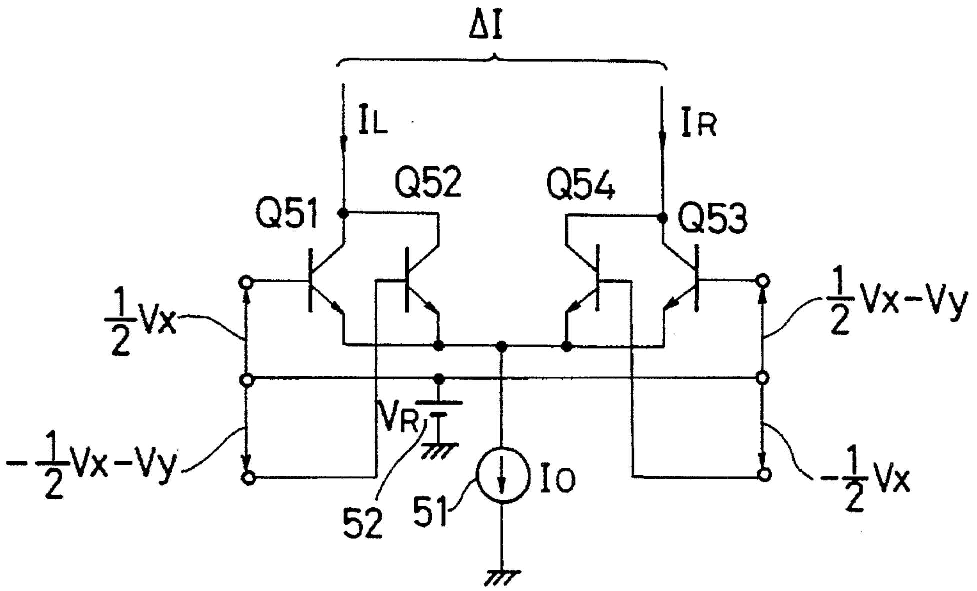
FIG.3 PRIOR ART
FIG. 3 is a circuit diagram showing a second example of the conventional bipolar multiplier of FIG. 1.
Figure 4:
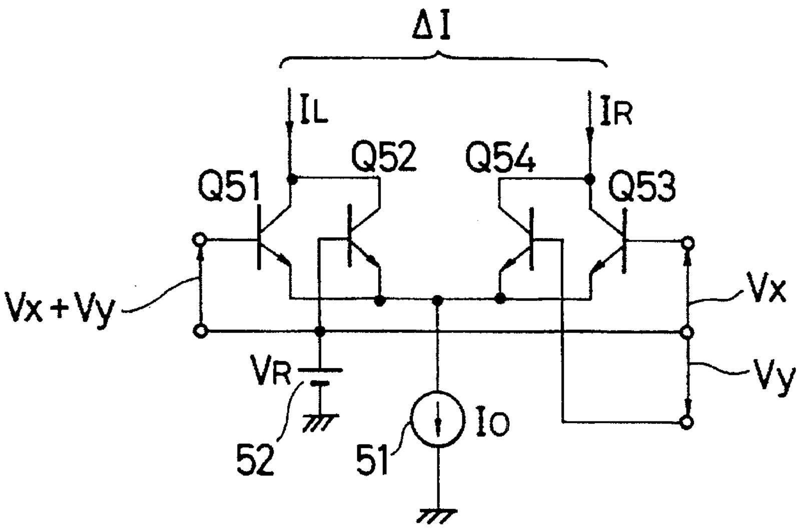
FIG.4 PRIOR ART
FIG. 4 is a circuit diagram showing a third example of the conventional bipolar multiplier of FIG. 1.
Figure 5:
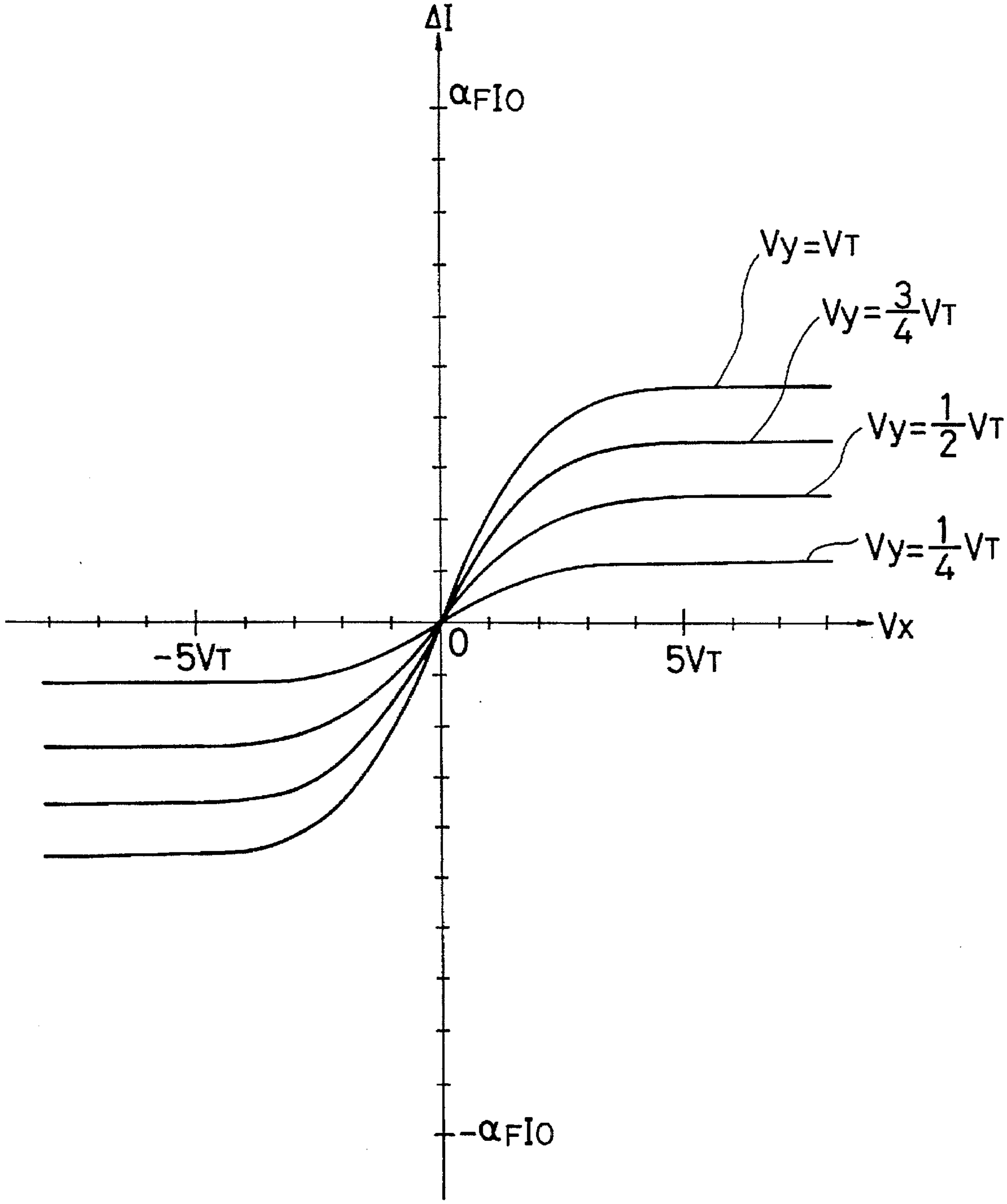
FIG.5 PRIOR ART
FIG. 5 is a graph showing the transfer characteristic of the first, second and third concrete examples of FIGS. 2, 3 and 4.
Figure 6:
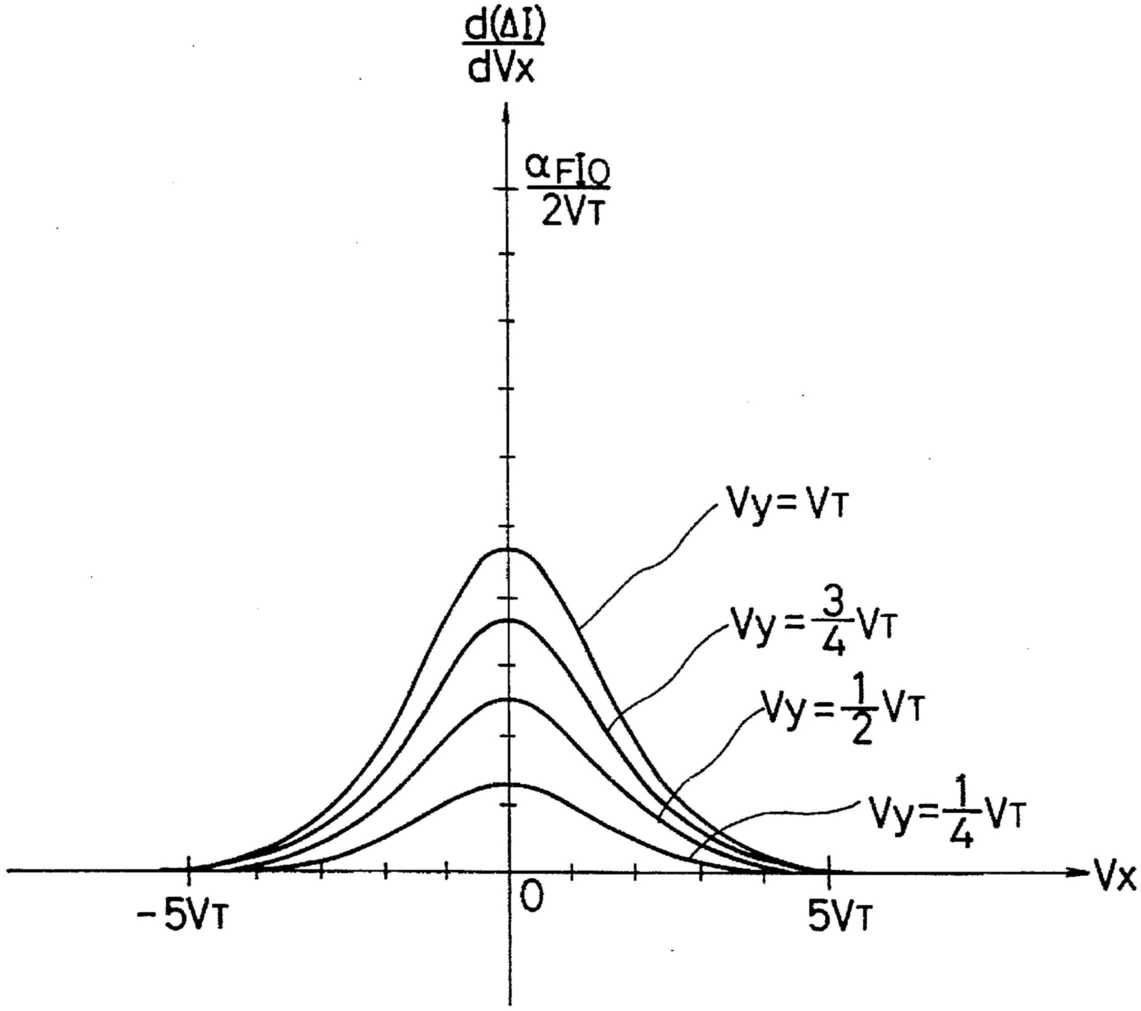
FIG.6 PRIOR ART
FIG. 6 is a graph showing the transconductance characteristic of the first, second and third concrete examples of FIGS. 2, 3 and 4.

It is seen from FIGS. 9 and 6 that the bipolar multiplier according to the first embodiment has the wider input voltage ranges providing a good linearity than those of the conventional multipliers of FIGS. 2, 3 and 4.

It is needless to say that the bipolar multiplier according to the first embodiment can operate at a low voltage such as 1 V.

SECOND EMBODIMENT

Figure 11:
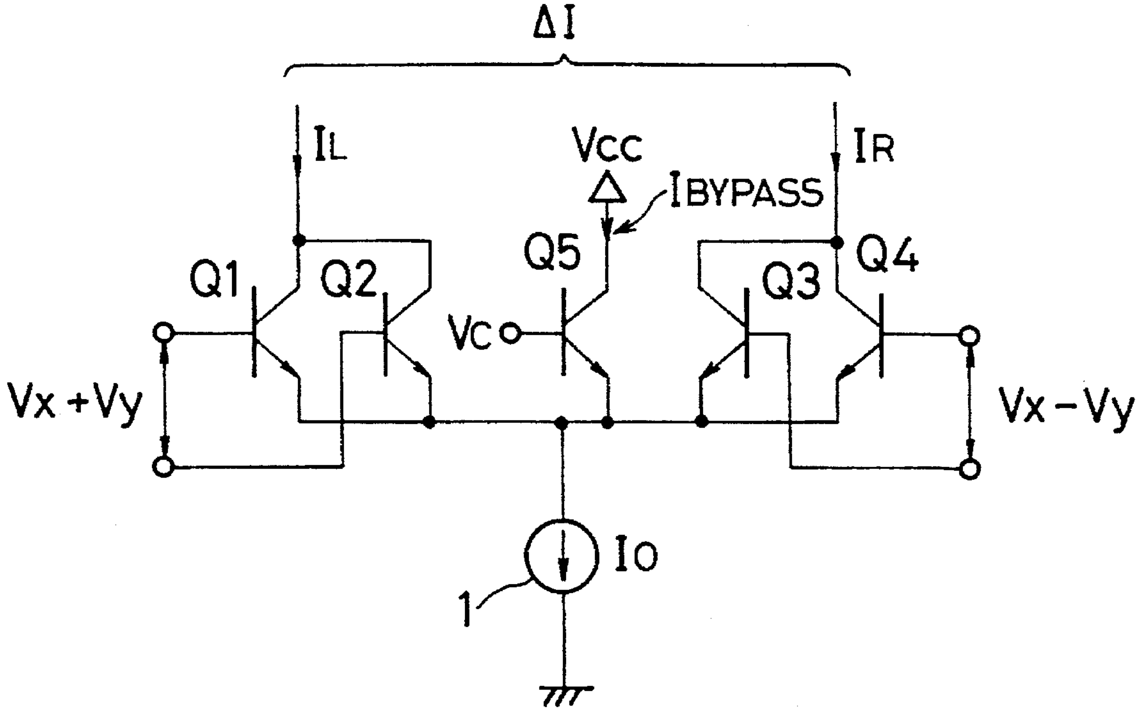
FIG. 11 is a circuit diagram of a bipolar multiplier according to a second embodiment of the present invention.

FIG. 11 shows a four-quadrant bipolar multiplier according to a second embodiment of the present invention.

This multiplier is obtained by setting the constants a and b at a=b=(½) in the multiplier according to the first embodiment. In the second embodiment, the input signal voltage $V_5$ applied to the base of the transistor Q5 is only the dc voltage $V_c$. This leads to an additional advantage of simplified production of the voltage $V_5$.

THIRD EMBODIMENT

Figure 12:
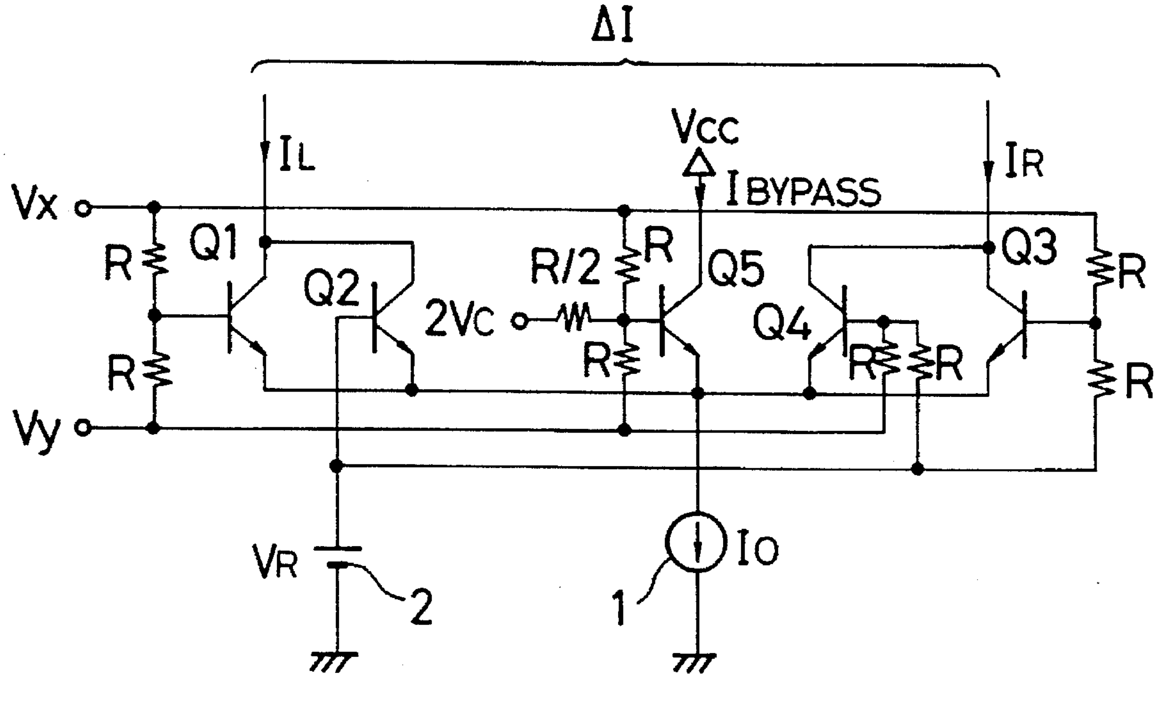
FIG. 12 is a circuit diagram of a bipolar multiplier according to a third embodiment of the present invention.

FIG. 12 shows a four-quadrant bipolar multiplier according to a third embodiment of the present invention.

This multiplier is obtained by setting the constants a and b to satisfy the relationships of (a−1)>0 and (b−1) >0 in the multiplier according to the first embodiment. In this case, the input signal voltages $V_1$, $V_2$, $V_3$, $V_4$ and $V_5$ applied to the bases of the transistors Q1, Q2, Q3, Q4 and Q5 can be all expressed by the sum of the first and second initial input signal voltages $V_x$ and $V_y$. In other words, these voltages $V_1$, $V_2$, $V_3$, $V_4$ and $V_5$ involve only addition and no subtraction. Therefore, the voltages $V_1$, $V_2$, $V_3$, $V_4$ and $V_5$ can be easily realized by resistive dividers.

FIG. 12 shows the simplest structure of the voltage dividing technique using resistors, in which each of the voltages $V_1$, $V_2$, $V_3$, $V_4$ and $V_5$ is obtained by dividing the sum of the voltage $V_x$ and $V_y$ into two by resistors with the same resistance value R.

Figure 13:
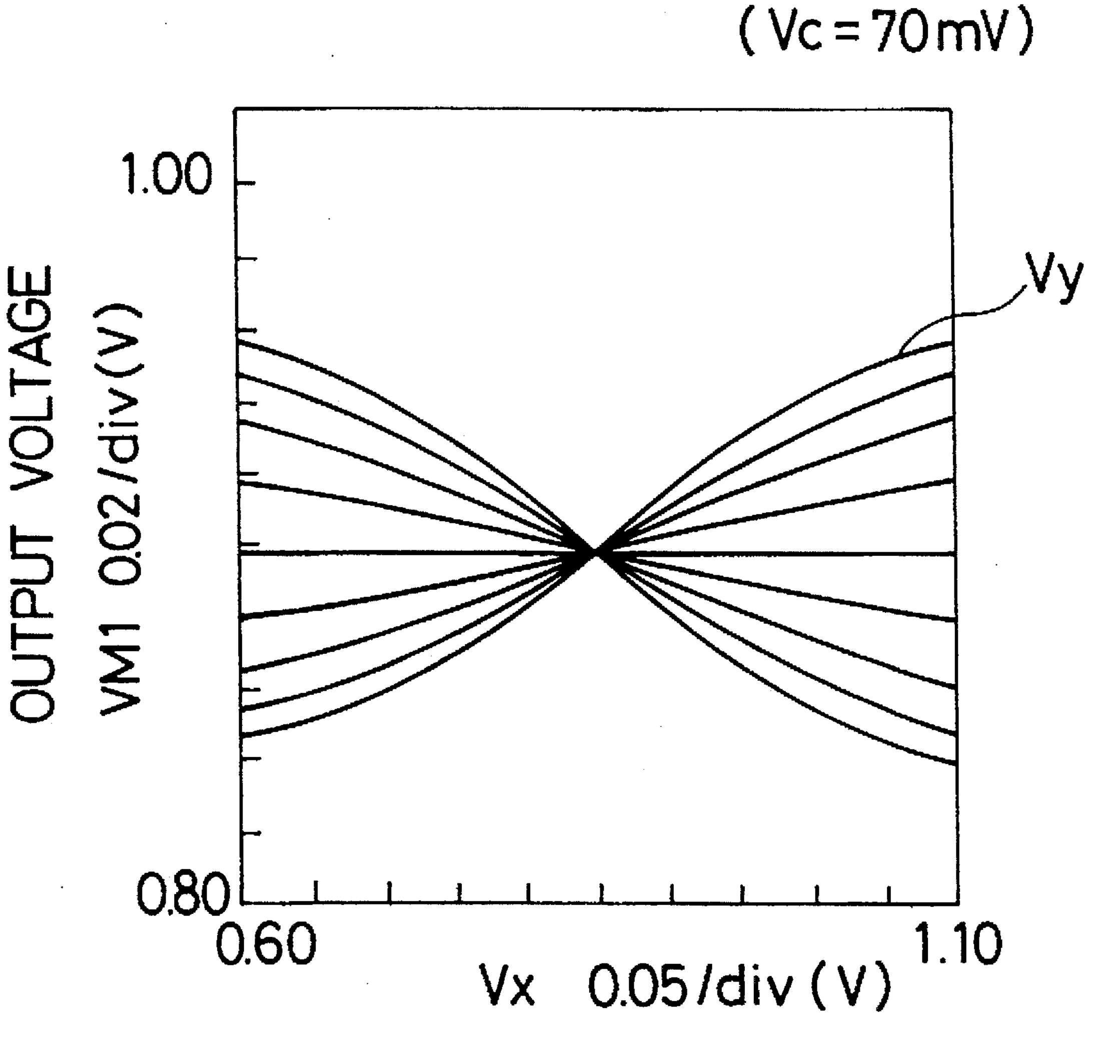
FIG. 13 is a graph showing an example of actual measurements of the transfer characteristic of the bipolar multiplier according to the third embodiment.

FIG. 13 shows the actual measurements for the multiplier of FIG. 12 that were obtained with the second initial input signal voltage $V_y$ being changed as a parameter in increments and decrements of 50 mV from 0 V when $V_c$=70 mV.

It is seen from FIG. 13 that this multiplier provides unsatisfactorily enlarged input voltage ranges because the linearity of this four-quadrant analog multiplier is slightly unsatisfactory. However, if the linearity is better than that of the Gilbert cell, it is often a more realistic advantage that a four-quadrant analog multiplier can be realized at a small circuit scale.

FOURTH EMBODIMENT

Figure 14:
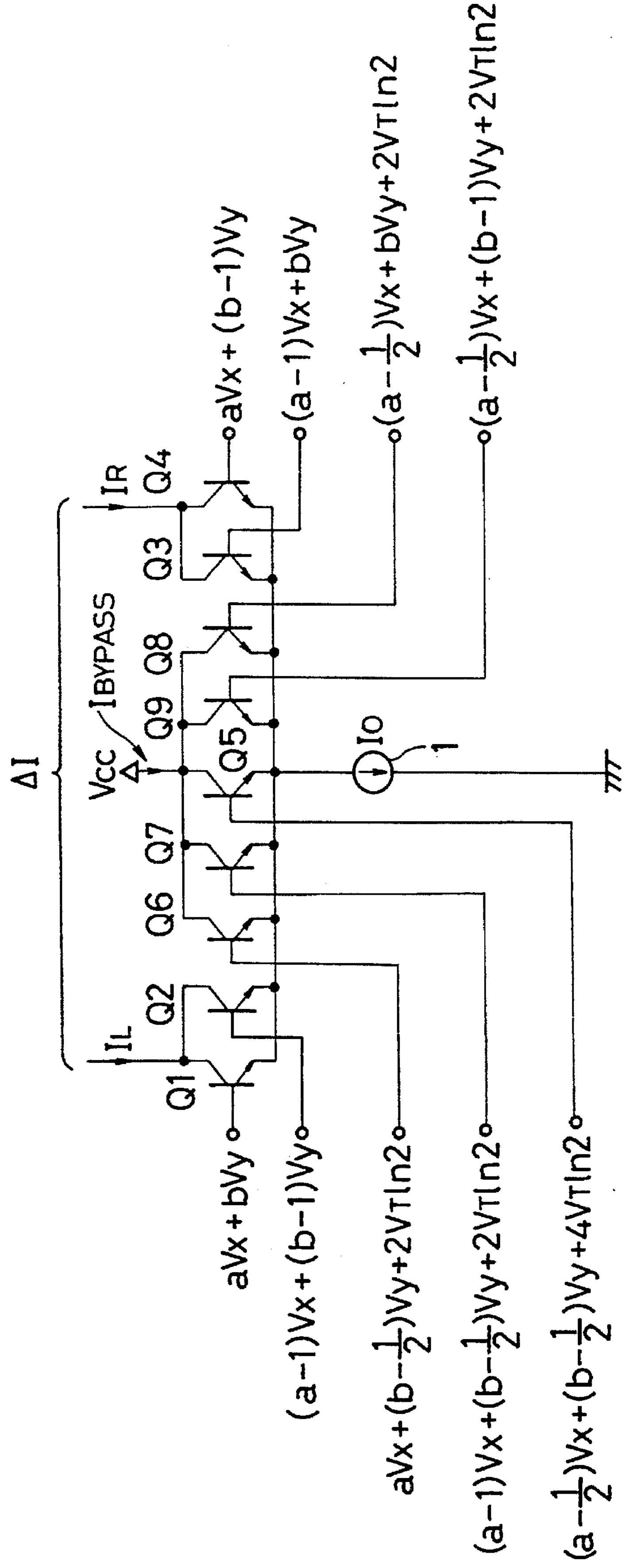
FIG. 14 is a circuit diagram of a bipolar multiplier according to a fourth embodiment of the present invention.

FIG. 14 shows a four-quadrant bipolar multiplier according to a fourth embodiment of the present invention.

As shown in FIG. 14, this multiplier is equivalent to one composed of the multiplier according to the first aspect and newly added npn-type bipolar transistors Q6, Q7, Q8 and Q9. The transistors Q6 and Q7 form a third transistor pair, and the transistors Q8 and Q9 form a fourth transistor pair.

The transistors Q6, Q7, Q8 and Q9 have the same emitter area as that of the transistors Q1, Q2, Q3, Q4 and Q5. This multiplier is of a symmetrical input type.

Emitters of the transistors Q6, Q7, Q8 and Q9 are coupled together to be connected to one end of the constant current source 1 (current value: $I_0$). The multitail cell is driven by a common tail current $I_0$ from the current source 1.

Collectors (or output ends) of the transistors Q6 and Q7 are connected in common to the collector of the transistor Q5. Collectors of the transistors Q8 and Q9 also are connected in common to the collector of the transistor Q5.

Here, the multitail cell in this multiplier includes nine transistors Q1, Q2, Q3, Q4, Q5, Q6, Q7, Q8 and Q9 and therefore, it may be termed a "nonuple-tail cell".

Bases (or input ends) of the transistors Q1, Q2, Q3 and Q4 are respectively applied with the same input signal voltages $V_1$, $V_2$, $V_3$ and $V_4$ as those in the first embodiment.

The dc voltage $V_c$ applied to the transistor Q5 is set as ($4V_T$·ln2) and therefore, the input signal voltage $V_5$ applied to the transistor Q5 is $[\{a-(½)\}V_x+\{b-(½)\}V_y+4V_T\ln 2]$.

The input signal voltages $V_6$, $V_7$, $V_8$ and $V_9$ applied respectively to the transistors Q6, Q7, Q8 and Q9 are $V_6=[aV_x+\{b-(½)\}V_y+2V_T\ln 2]$, $V_7=[(a-1)V_x+\{b-(½)\}V_y+2V_T\ln 2]$, $V_8=[\{a-(½)\}V_x+bV_y+2V_T\ln 2]$, and $V_9=[\{a-(½)\}V_x+(b-1)V_y+2V_T\ln 2]$, respectively.

Collector currents $I_{ci}$ (i=1 to 9 ) of these nine bipolar transistors Q1, Q2, Q3, Q4, Q5, Q6, Q7, Q8 and Q9 are expressed by the following equations (23) to (31), respectively, where $V_E$ is the common emitter voltage.

$$I_{C1}=I_S\exp\left\{\frac{(aV_x+bV_y+V_R-V_E)}{V_T}\right\} \tag{23}$$

$$I_{C2}=I_S\exp\left\{\frac{(a-1)V_x+(b-1)V_y+V_R-V_E}{V_T}\right\} \tag{24}$$

$$I_{C3}=I_S\exp\left\{\frac{aV_x+(b-1)V_y+V_R-V_E}{V_T}\right\} \tag{25}$$

$$I_{C4}=I_S\exp\left\{\frac{(a-1)V_x+bV_y+V_R-V_E}{V_T}\right\} \tag{26}$$

$$I_{C5}=I_S\exp\left\{\frac{\left(a-\frac{1}{2}\right)V_x+\left(b-\frac{1}{2}\right)V_y+V_R-V_E+4V_T\ln 2}{V_T}\right\} \tag{27}$$

$$I_{C6}=I_S\exp\left\{\frac{aV_x+\left(b-\frac{1}{2}\right)V_y+V_R-V_E+2V_T\ln 2}{V_T}\right\} \tag{28}$$

$$I_{C7}=I_S\exp\left\{\frac{(a-1)V_x+\left(b-\frac{1}{2}\right)V_y+V_R-V_E+2V_T\ln 2}{V_T}\right\} \tag{29}$$

$$I_{C8}=I_S\exp\left\{\frac{\left(a-\frac{1}{2}\right)V_x+bV_y+V_R-V_E+2V_T\ln 2}{V_T}\right\} \tag{30}$$

$$I_{C9}=I_S\exp\left\{\frac{\left(a-\frac{1}{2}\right)V_x+(b-1)V_y+V_R-V_E+2V_T\ln 2}{V_T}\right\} \tag{31}$$

The relationship of the tail current $I_0$ with the collector currents $I_{ci}$ provides the following equation (32) as $$I_{C1}+I_{C2}+I_{C3}+I_{C4}+I_{C5}+I_{C6}+I_{C7}+I_{C8}+I_{C9}=\alpha_F I_0 \tag{32}$$

By solving the equation (23) to (32), the following equation (33) can be obtained, which represents the differential output current ΔI of the bipolar multiplier.

$$\Delta I = (I_{C1}+I_{C2})-(I_{C3}+I_{C4}) = \frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+2\right\}\left\{\cosh\left(\frac{V_y}{2V_T}\right)+2\right\}} \tag{33}$$

Figure 15:
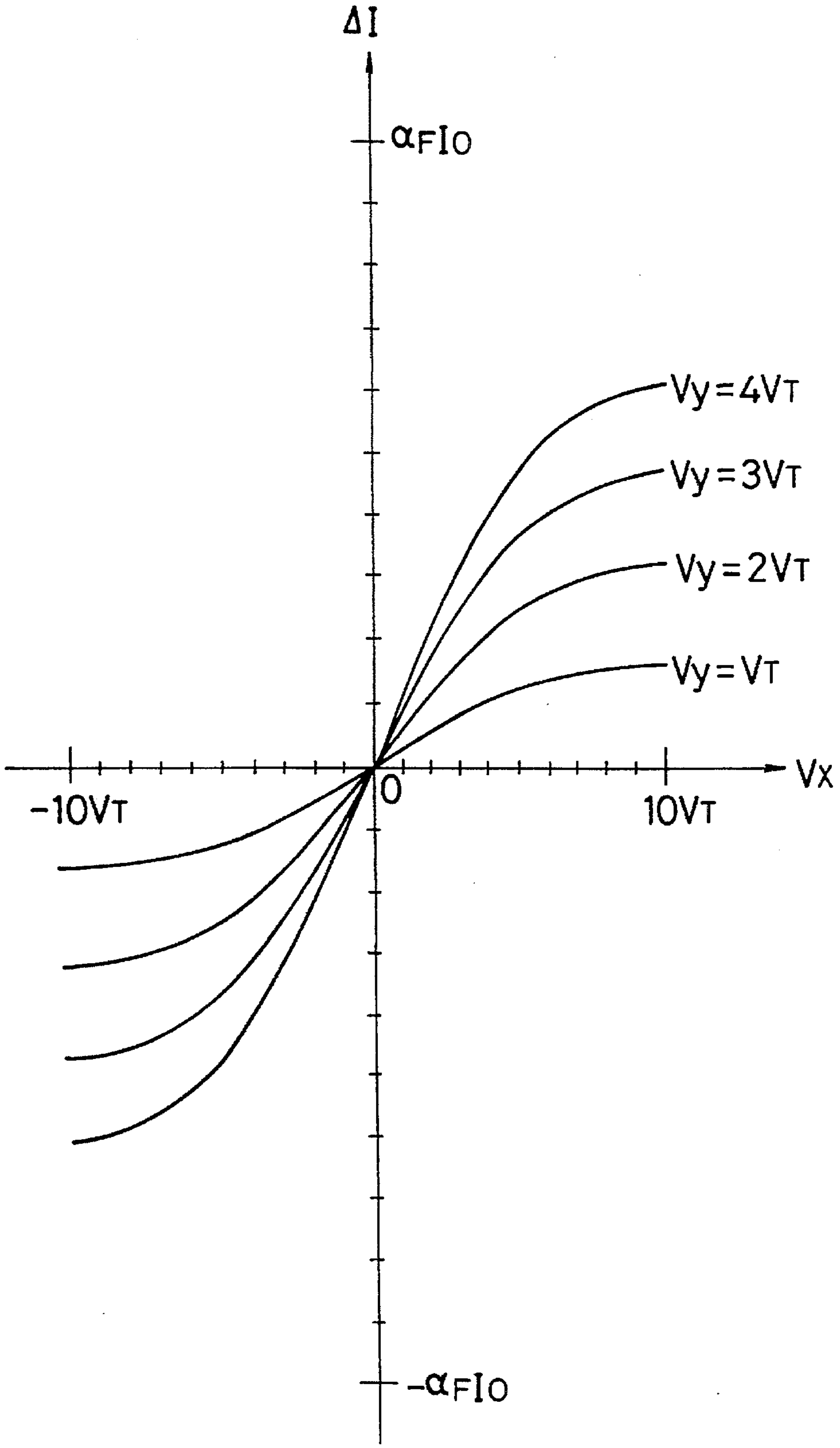
FIG. 15 is a graph showing the transfer characteristic of the multiplier according to the fourth embodiment.

FIG. 15 shows the transfer characteristic of the multiplier according to the fourth embodiment, which obtained from the equation (33).

The transconductance characteristic of this multiplier can be expressed by the following equation (34) as $$\frac{d(\Delta I)}{dV_X} = \frac{\alpha_F I_0}{2V_T}\left[\frac{\left\{2\cosh\left(\frac{V_x}{2V_T}\right)+1\right\}\sinh\left(\frac{V_y}{2V_T}\right)}{\left\{\cosh\left(\frac{V_x}{2V_T}\right)+2\right\}^2\left\{\cosh\left(\frac{V_y}{2V_T}\right)+2\right\}}\right] \tag{34}$$

Figure 16:
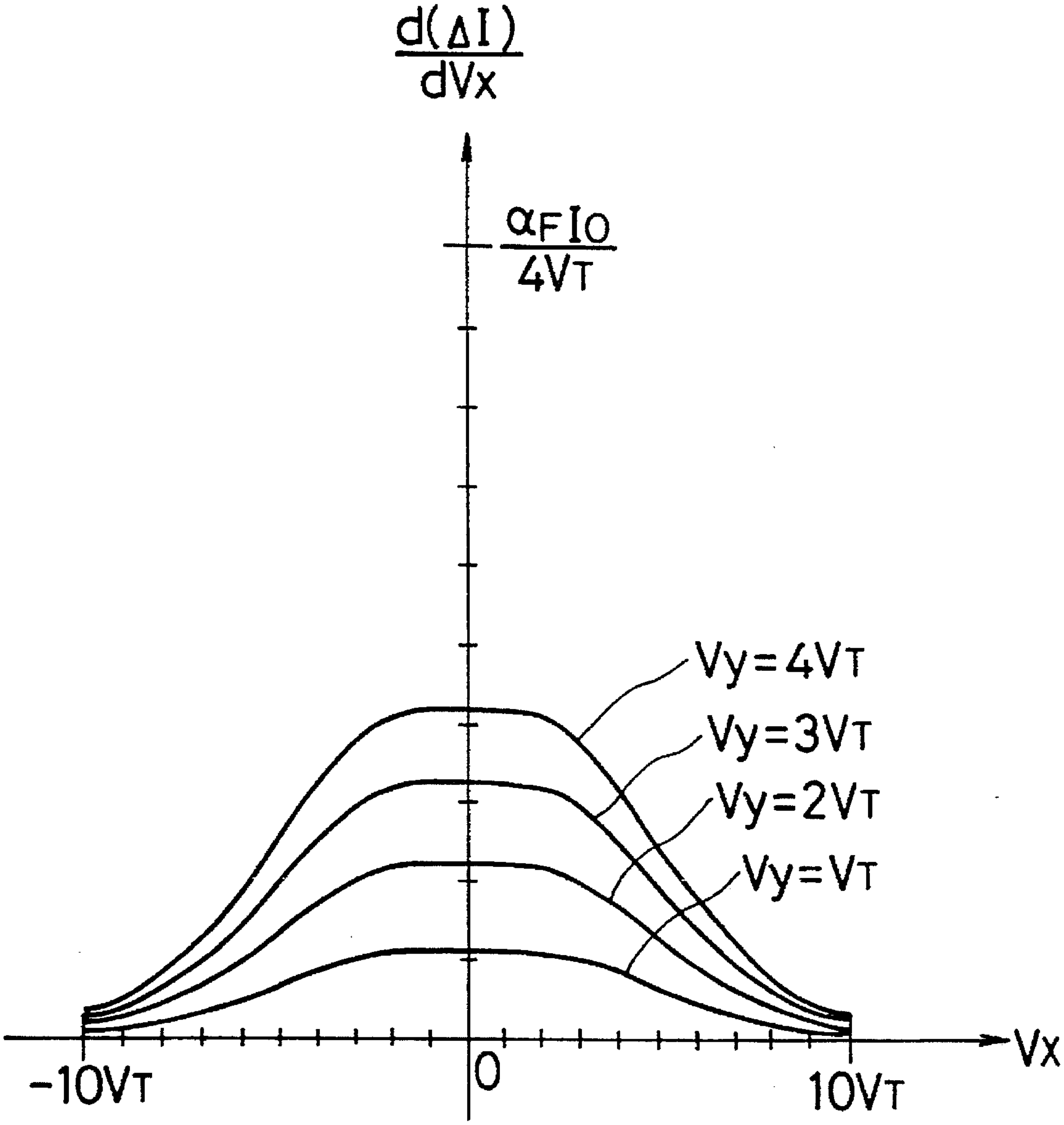
FIG. 16 is a graph showing the transconductance characteristic of the multiplier according to the fourth embodiment.

FIG. 16 shows the transconductance characteristic of this multiplier, which is obtained from the equation (34).

As described above, it can be concluded that the multitail cell as shown in FIG. 14 can realize a four-quadrant bipolar multiplier having a wide linear input voltage range.

In this case, the current $I_{BYASS}$ bypassed by the five transistors Q5, Q6, Q7, Q8 and Q9 for linearization can be expressed by the following equation (35) as $$I_{BYPASS} = I_{C5}+I_{C6}+I_{C7}+I_{C8}+I_{C9} = \alpha_F I_0\left[1-\frac{\cosh\left(\frac{V_x}{2V_T}\right)\cosh\left(\frac{V_y}{2V_T}\right)}{\left\{\cosh\left(\frac{V_x}{2V_T}\right)+2\right\}\left\{\cosh\left(\frac{V_y}{2V_T}\right)+2\right\}}\right] \tag{35}$$

Figure 17:
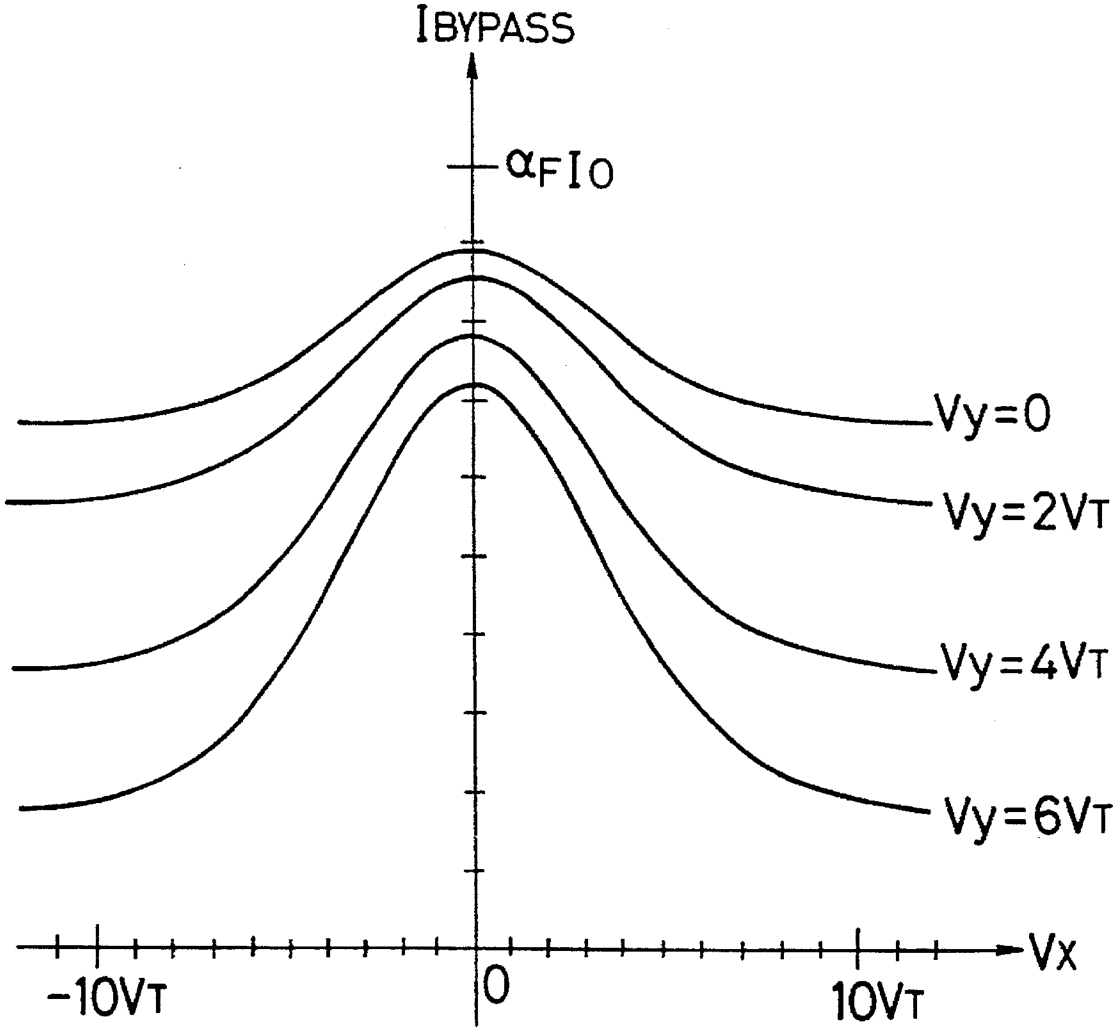
FIG. 17 is graph showing the bypass current characteristic of the multiplier according to the fourth embodiment.

FIG. 17 shows the characteristic of the bypass current $I_{BYPASS}$. The transconductance characteristic of the bypass current $I_{BYPASS}$ can be expressed by the following equation (36) as $$\frac{dI_{BYPASS}}{dV_x} = -\frac{\alpha_F I_0}{2V_T}\left[\frac{\cosh\left(\frac{V_x}{2V_T}\right)\sinh\left(\frac{V_x}{2V_T}\right)}{\left\{\cosh\left(\frac{V_y}{2V_T}\right)+2\right\}\left\{\cosh\left(\frac{V_x}{2V_T}\right)+2\right\}^2}\right] \tag{36}$$

FIFTH EMBODIMENT

Figure 18:
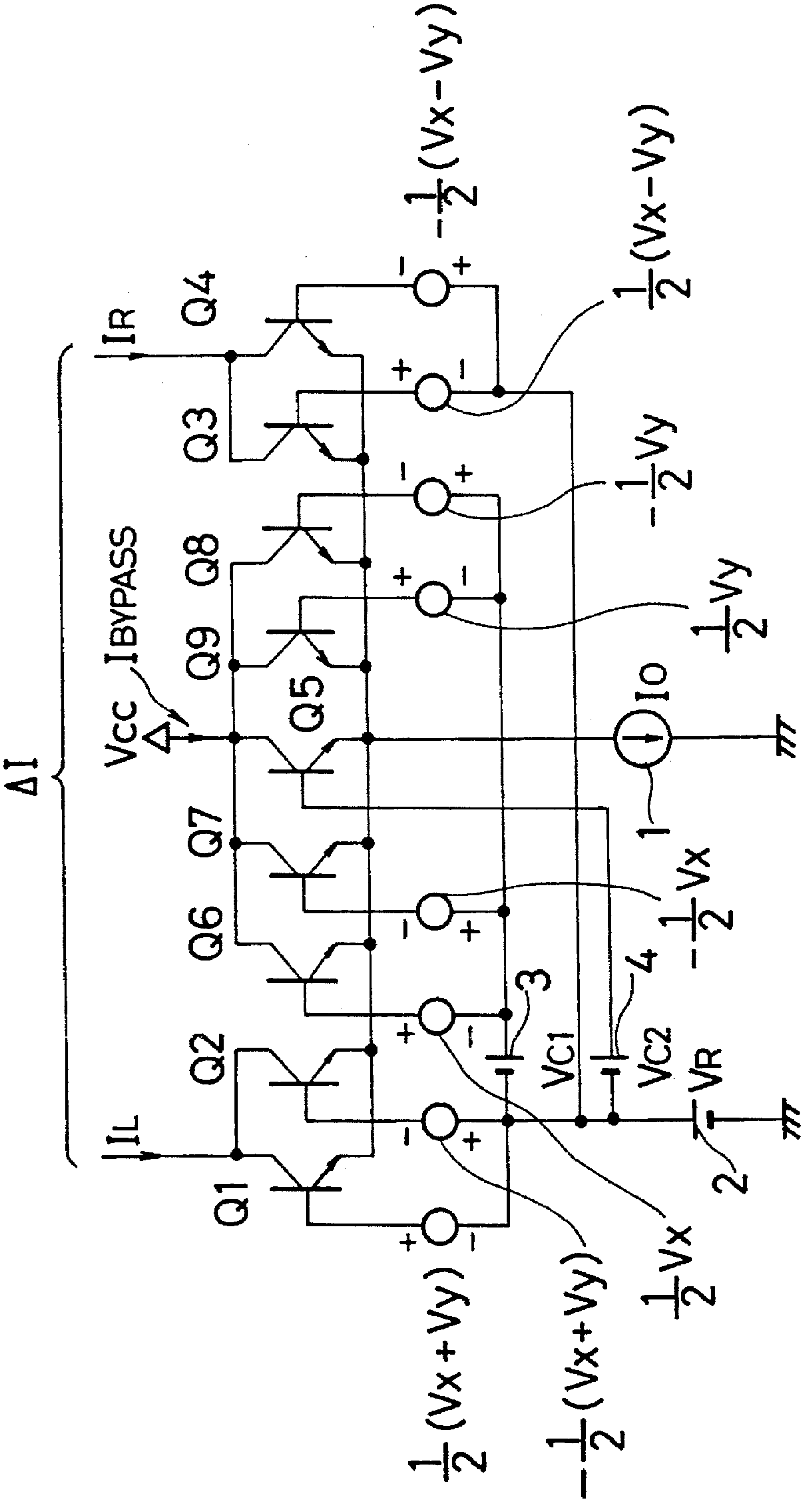
FIG. 18 is a circuit diagram of a bipolar multiplier according to a fifth embodiment of the present invention.

FIG. 18 shows a four-quadrant bipolar multiplier according to a fifth embodiment of the present invention.

This multiplier is obtained by setting the constants a and b at a=b=(½) in the multiplier according to the fourth embodiment. In the fifth embodiment, the input signal voltage $V_5$ applied to the base of the transistor Q5 is only the dc voltage $V_c$. This leads to an additional advantage of simplified production of the voltage $V_5$.

In FIG. 18, the symbol o indicates a signal source, the reference numerals 3 and 4 are positive dc voltage sources whose supply voltages are $V_{c1}$ and $V_{c2}$, respectively.

SIXTH EMBODIMENT

Figure 19:
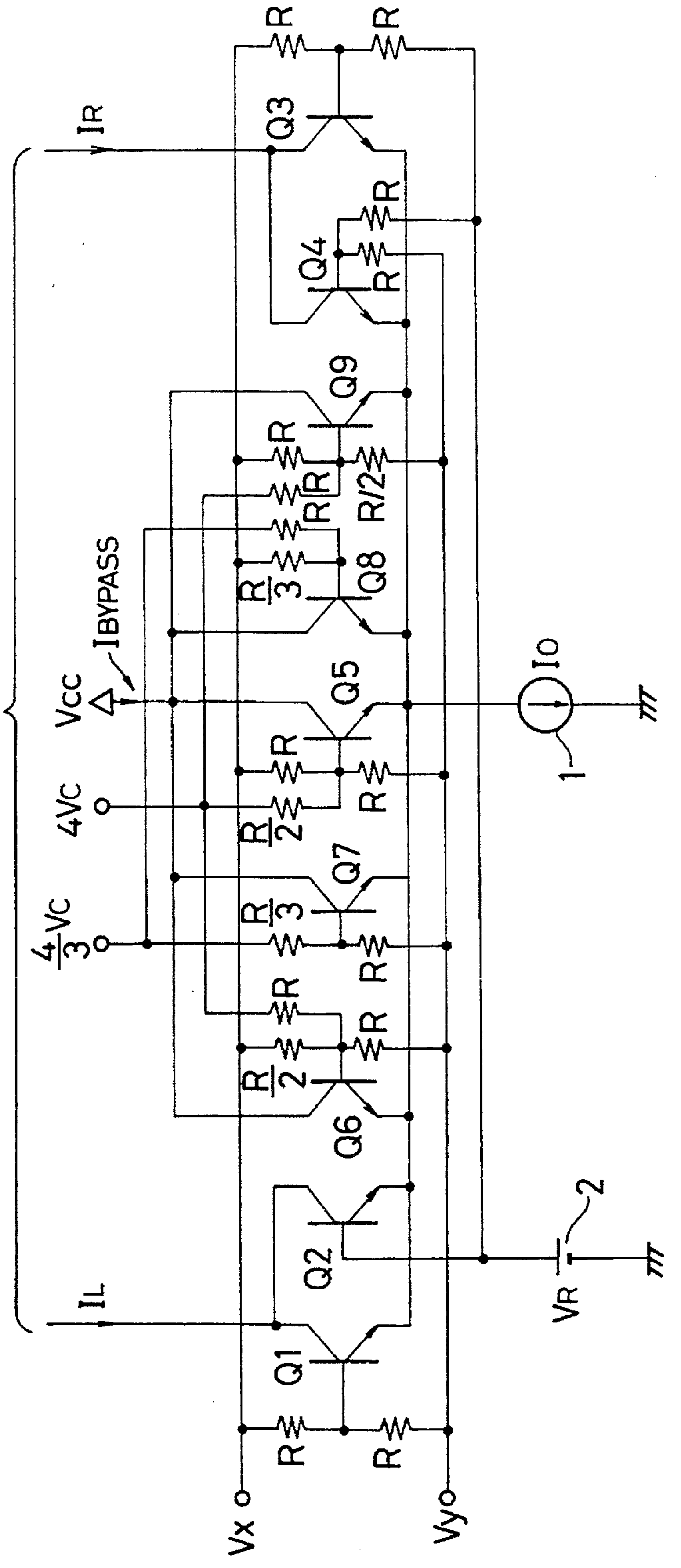
FIG. 19 is a circuit diagram of a bipolar multiplier according to a sixth embodiment of the present invention.

FIG. 19 shows a four-quadrant bipolar multiplier according to a sixth embodiment of the present invention.

This multiplier is obtained by setting the constants a and b to satisfy the relationships of (a−1)>0 and (b−1) >0 in the multiplier according to the fourth embodiment. In this case, the input signal voltages $V_1$, $V_2$, $V_3$, $V_4$, $V_5$, $V_6$, $V_7$, $V_8$ and $V_9$ applied to the bases of the transistors Q1, Q2, Q3, Q4, Q5, Q6, Q7, Q8 and Q9 can be all expressed by the sum of the voltages $V_x$ and $V_y$. Therefore, the voltages $V_1$, $V_2$, $V_3$, $V_4$, $V_5$, $V_6$, $V_7$, $V_8$ and $V_9$ can be easily realized by resistive dividers.

FIG. 19 shows the simplest structure of the voltage dividing technique using resistors, in which each of the voltages $V_1$, $V_2$, $V_3$, $V_4$, $V_5$, $V_6$, $V_7$, $V_8$ and $V_9$ is obtained by division of the sum of the voltage $V_x$ and $V_y$ using resistors.

Figure 20:
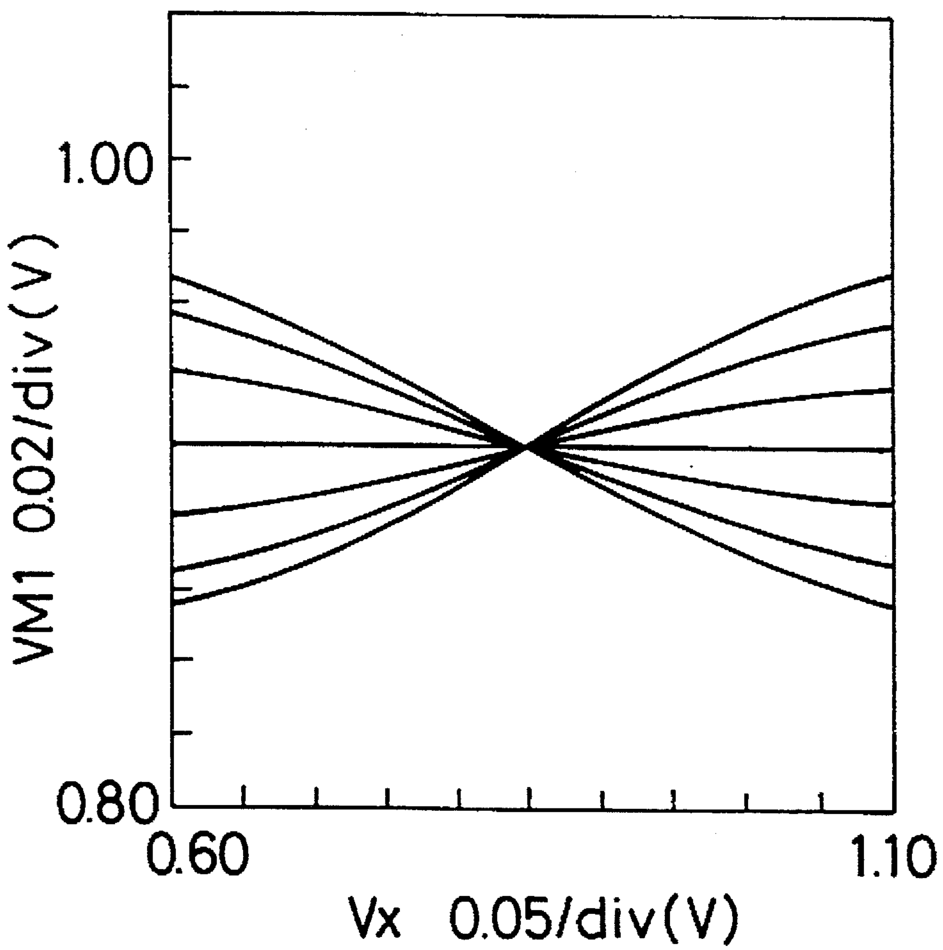
FIG. 20 is a graph showing an example of actual measurements of the transfer characteristic of the bipolar multiplier according to the sixth embodiment.

FIG. 20 shows the actual measurements for the multiplier of FIG. 18 that were obtained with the second initial input signal voltage $V_y$ being changed as a parameter in increments and decrements of 50 mV from 0 V when $V_c$=35 mV.

SEVENTH EMBODIMENT

Figure 21:
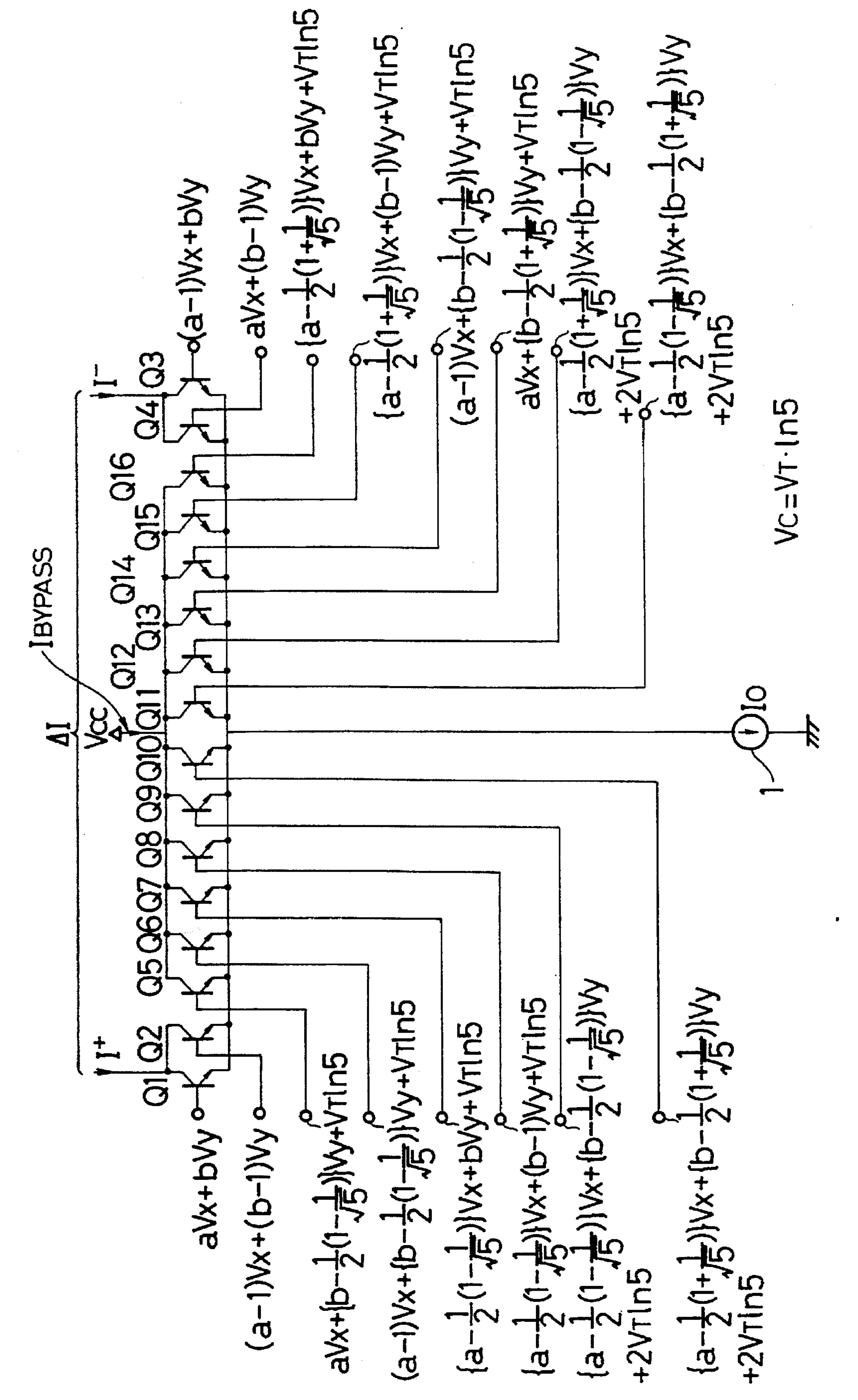
FIG. 21 is a circuit diagram of a bipolar multiplier according to a seventh embodiment of the present invention.

FIG. 21 shows a four-quadrant bipolar multiplier according to a seventh embodiment of the present invention.

As shown in FIG. 21, this multiplier has a multitail cell made of a first transistor pair of npn-type bipolar transistors Q1 and Q2, a second transistor pair of npn-type bipolar transistors Q3 and Q4, and twelve npn-type bipolar transistors Q5, Q6, Q7, Q8, Q9, Q10, Q11, Q12, Q13, Q14, Q15 and Q16. The sixteen transistors have the same emitter area. This multiplier is of a symmetrical input type.

Emitters of the transistors Q1, Q2, Q3, Q4, Q5, Q6, Q7, Q8, Q9, Q10, Q11, Q12, Q13, Q14, Q15 and Q16 are coupled together to be connected to one end of a constant current source 1 (current value: $I_0$). The other end of the current source 1 is connected to the ground. The multitail cell is driven by a common tail current $I_0$ from the current source 1.

Collectors of the transistors Q1 and Q2 are coupled together to form one of differential output ends of the multiplier. Collectors of the transistors Q3 and Q4 also are coupled together to form the other of the differential output ends of the multiplier.

Collectors of the transistors Q5, Q6, Q7, Q8, Q9, Q10, Q11, Q12, Q13, Q14, Q15 and Q16 are coupled together through which a bypass current $I_{BYPASS}$ flows A differential output current ΔI of this multiplier is defined as $\Delta I = I^+ - I^-$, where $I^+$ is an output current of the first transistor pair and $I^-$ is an output current of the second transistor pair.

As shown in FIG. 21, this multiplier is equivalent to one composed of the multiplier according to the first aspect in which the twelve npn-type bipolar transistors Q5, Q6, Q7, Q8, Q9, Q10, Q11, Q12, Q13, Q14, Q15 and Q16 are added instead of the transistors Q5. These twelve transistors produce a bypass current $I_{BYPASS}$.

$V_5=\{(a-½)V_x+(b-½)V_y+V_c\}$, where a and b are constants and $V_c$ is a positive dc voltage. These are equal to those of the first embodiment. However, in this embodiment, $V_c$–VT·ln5.

Bases of the transistors Q5, Q6, Q7, Q8, Q9, Q10, Q11, Q12, Q13, Q14, Q15 and Q16 are respectively applied with the input signal voltages $V_5$, $V_6$, $V_7$, $V_8$, $V_9$, $V_{10}$, $V_{11}$, $V_{12}$, $V_{13}$, $V_{14}$, $V_{15}$ and $V_{16}$, each of which is set as follows:

$V_5=[aV_x+\{(b-(½)(1-5^{-½})\}V_y+V_c]$, $V_6=[(a-1)V_x+\{b-(½)(1-5^{-½})\}V_y+V_c]$, $V_7=[\{a-(½)(1-5^{-½})\}V_x+bV_y+V_c]$, $V_8=[\{a-(½)(1-5^{-½})\}V_x+(b-1)V_y+V_c]$, $V_9=[\{a-(½)(1-5^{-½})\}V_x+\{b-(½)(1-5^{-½})\}V_y+2V_c]$, $V_{10}=[\{a-(½)(1+5^{-½})\}V_x+\{b-(½)(1+5^{-½}))V_y+2V_c]$, $V_{11}=[\{a-(½)(1-5^{-½})\}V_x+\{b-(½)(1+5^{-½})\}V_y+2V_c]$, $V_{12}=[\{a-(½)(1+5^{-½})\}V_x+\{b-(½)(1-5^{-½})\}V_y+2V_c]$, $V_{13}=[aV_x+\{b-(½)(1+5^{-½})\}V_y+V_c]$, $V_{14}=[(a-1)V_x+\{b-(½)(1-5^{-½}))V_y+V_c]$, $V_{15}=[\{a-(½)(1+5^{-½})\}V_x+(b-1)V_y+V_c]$, and $V_{16}=[\{a-(½)(1+5^{-½})\}V_x+bV_y+V_c]$.

The number of transistors required for a multitail cell increases according to the square of n where n is a natural number (for example, $2^2=4$, $3^2=9$, $4^2=16$), as enhancement of the input voltage range of the multiplier progresses.

In this embodiment, the differential output current ΔI can be expressed by the following equation (37), its transconductance $d(\Delta I)/dV_x$ by the equation (38), the bypass current $I_{BYPASS}$ by the equation (39), and its transconductance by the equation (40).

$$\Delta I = \frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right) + 5\cosh\left(\frac{V_x}{2\sqrt{5}\,V_T}\right)\right\}\left\{\cosh\left(\frac{V_y}{2V_T}\right) + 5\cosh\left(\frac{V_y}{2\sqrt{5}\,V_T}\right)\right\}} \tag{37}$$

$$\frac{d(\Delta I)}{dV_x} = \frac{\alpha_F I_0}{2V_T} \times \frac{\sinh\left(\frac{V_y}{2V_T}\right)\left\{5\cosh\left(\frac{V_x}{2V_T}\right)\cosh\left(\frac{V_x}{2\sqrt{5}\,V_T}\right) + \sqrt{5}\,\sinh\left(\frac{V_x}{2V_T}\right)\sinh\left(\frac{V_x}{2\sqrt{5}\,V_T}\right) + 1\right\}}{\left[\left\{\cosh\left(\frac{V_y}{2V_T}\right) + 5\cosh\left(\frac{Y_y}{2\sqrt{5}\,V_T}\right)\right\}\left\{\cosh\left(\frac{V_x}{2V_T}\right) + 5\cosh\left(\frac{V_x}{2\sqrt{5}\,V_T}\right)\right\}\right]^2} \tag{38}$$

$$I_{BYPASS} = I_{C5} + I_{C6} + I_{C7} + I_{C8} + I_{C9} + I_{C10} + I_{C11} + I_{C12} + I_{C13} + I_{C14} + I_{C15} + I_{C16} \tag{39}$$

$$= \alpha_F I_0 \times \left[1 - \frac{\cosh\left(\frac{V_x}{2V_T}\right)\cosh\left(\frac{V_y}{2V_T}\right)}{\left\{\cosh\left(\frac{V_x}{2V_T}\right) + 5\cosh\left(\frac{V_x}{2\sqrt{5}\,V_T}\right)\right\}\left\{\cosh\left(\frac{V_y}{2V_T}\right) + 5\cosh\left(\frac{V_y}{2\sqrt{5}\,V_T}\right)\right\}}\right]$$

$$\frac{d(I_{BYPASS})}{dV_x} = -\frac{\alpha_F I_0}{2V_T} \times \frac{\cosh\left(\frac{V_y}{2V_T}\right)\left\{5\sinh\left(\frac{V_x}{2V_T}\right)\cosh\left(\frac{V_x}{2\sqrt{5}\,V_T}\right) - \sqrt{5}\,\cosh\left(\frac{V_x}{2V_T}\right)\sinh\left(\frac{V_x}{2\sqrt{5}\,V_T}\right)\right\}}{\left[\left\{\cosh\left(\frac{V_y}{2V_T}\right) + 5\cosh\left(\frac{Y_y}{2\sqrt{5}\,V_T}\right)\right\}\left\{\cosh\left(\frac{V_x}{2V_T}\right) + 5\cosh\left(\frac{V_x}{2\sqrt{5}\,V_T}\right)\right\}\right]^2} \tag{40}$$

Figure 22:
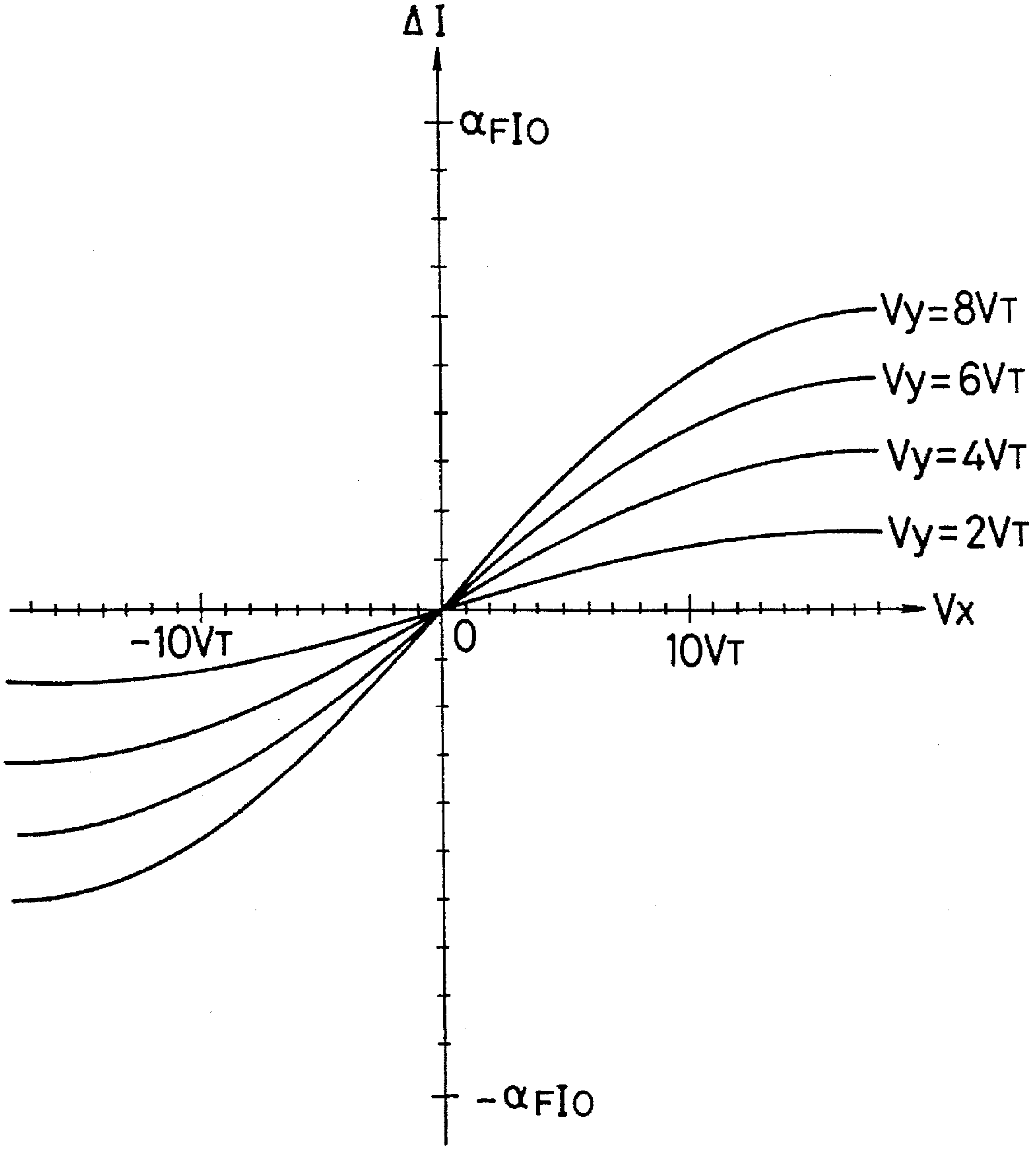
FIG. 22 is a graph showing the transfer characteristic of the multiplier according to the seventh embodiment.
Figure 23:
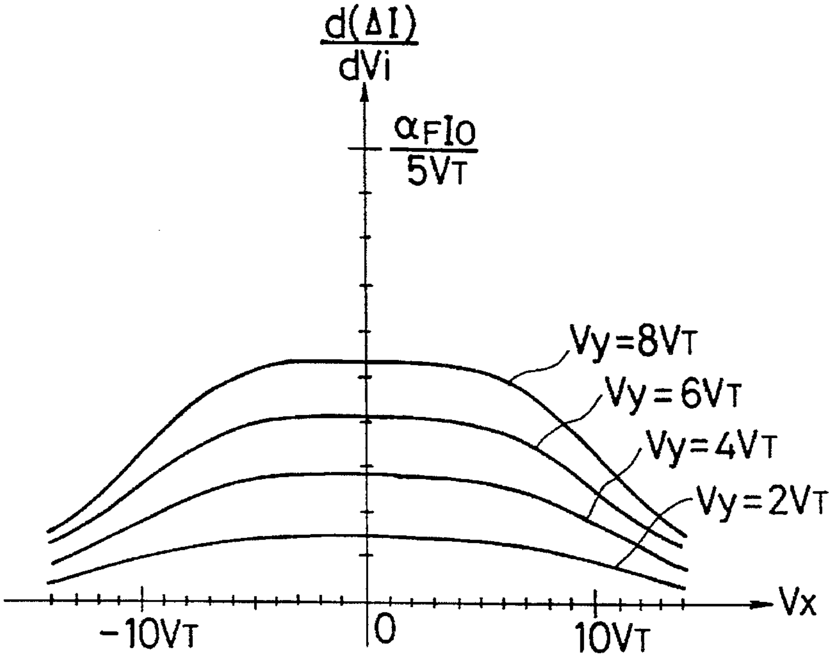
FIG. 23 is a graph showing the transconductance characteristic of the multiplier according to the seventh embodiment.
Figure 24:
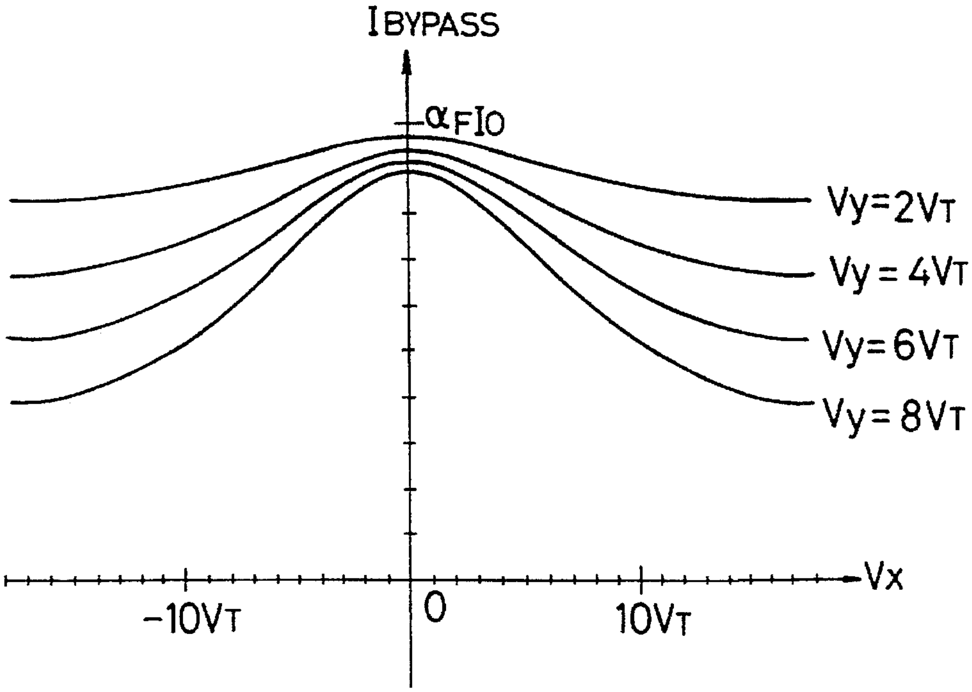
FIG. 24 is graph showing the bypass current characteristic of the multiplier according to the seventh embodiment.
Figure 25:
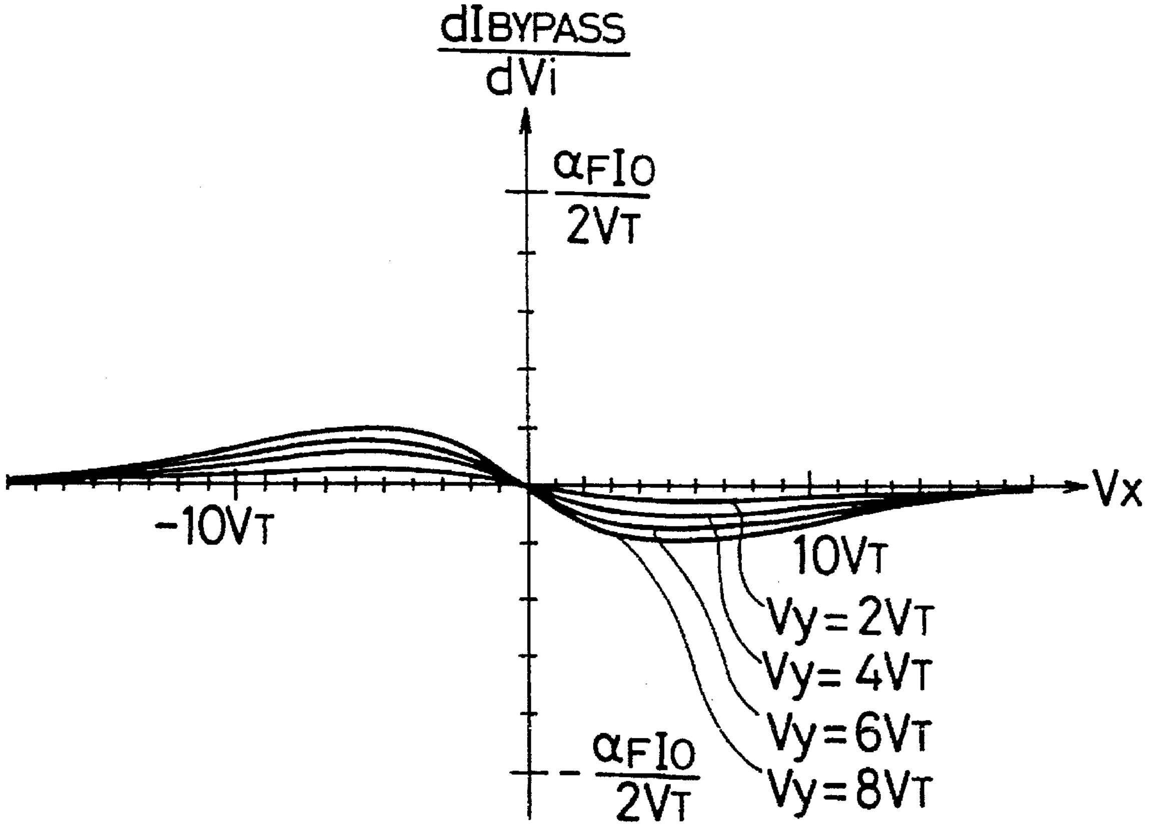
FIG. 25 is graph showing the bypass current transconductance characteristic of the multiplier according to the seventh embodiment.

Bases of the transistors Q1, Q2, Q3 and Q4 are respectively applied with the first, second, third, fourth and fifth input signal voltages $V_1$, $V_2$, $V_3$, $V_4$ and $V_5$ as $V_1=(aV_x+bV_y)$, $V_2=\{(a-1)V_x+(b-1)V_y\}$, $V_3=\{(a-1)V_x+bV_y\}$, and $V_4=\{aV_x+(b-1)V_y\}$, and FIG. 22 shows the transfer characteristic of the seventh embodiment of FIG. 15, FIG. 23 the transconductance characteristic thereof, FIG. 18 the bypass current characteristic, and FIG. 19 the bypass current transconductance characteristic.

EIGHTH EMBODIMENT

Figure 26:
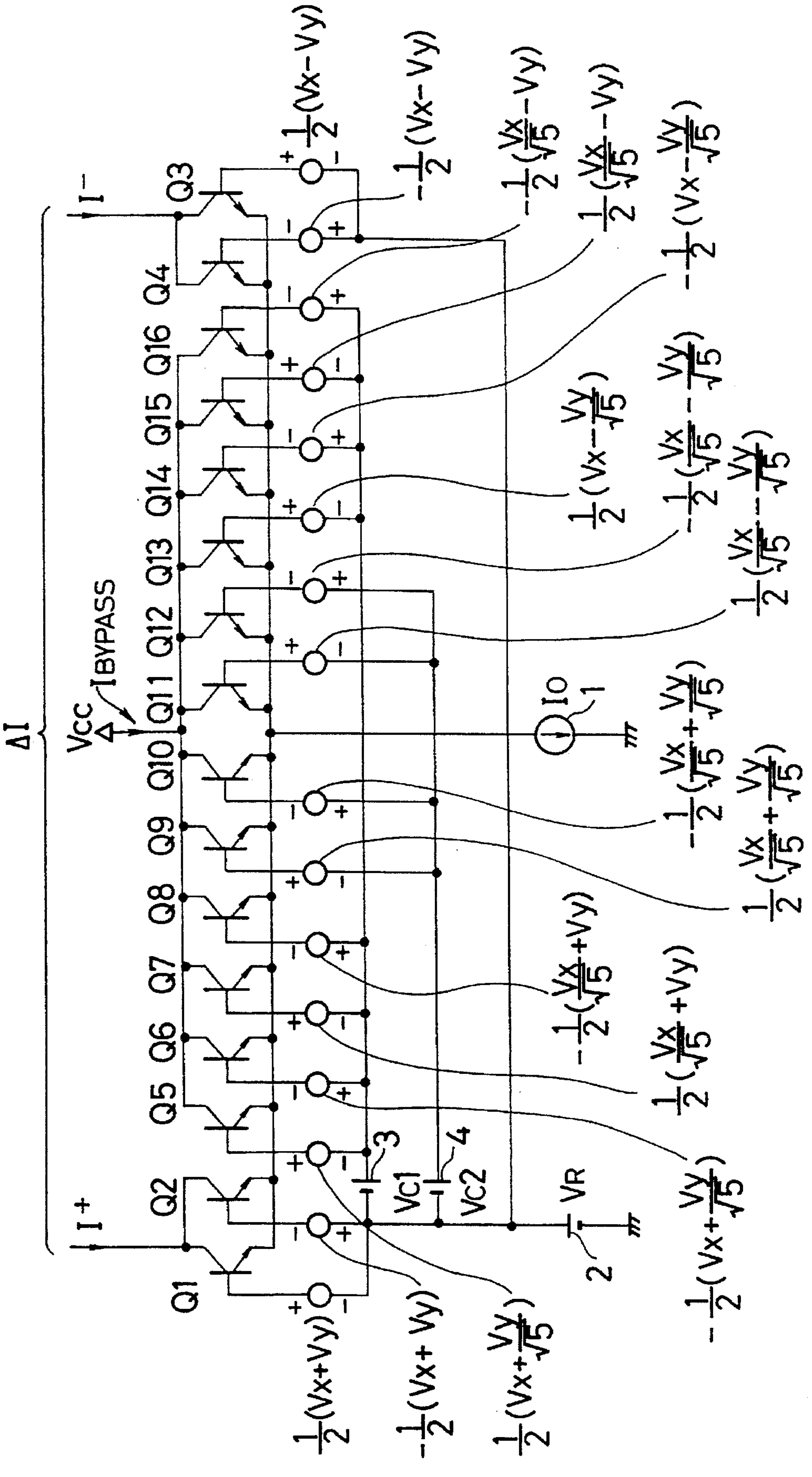
FIG. 26 is a circuit diagram of a bipolar multiplier according to an eighth embodiment of the present invention.

FIG. 26 shows a four-quadrant bipolar multiplier according to an eighth embodiment of the present invention.

This multiplier is obtained by setting the constants a and b at a=b=(½) in the multiplier according to the seventh embodiment.

In FIG. 26, the symbol o indicates a signal source, the reference numerals 3 and 4 are positive dc voltage sources whose supply voltages are $V_{c1}$ and $V_{c2}$, respectively.

NINTH EMBODIMENT

Figure 27:
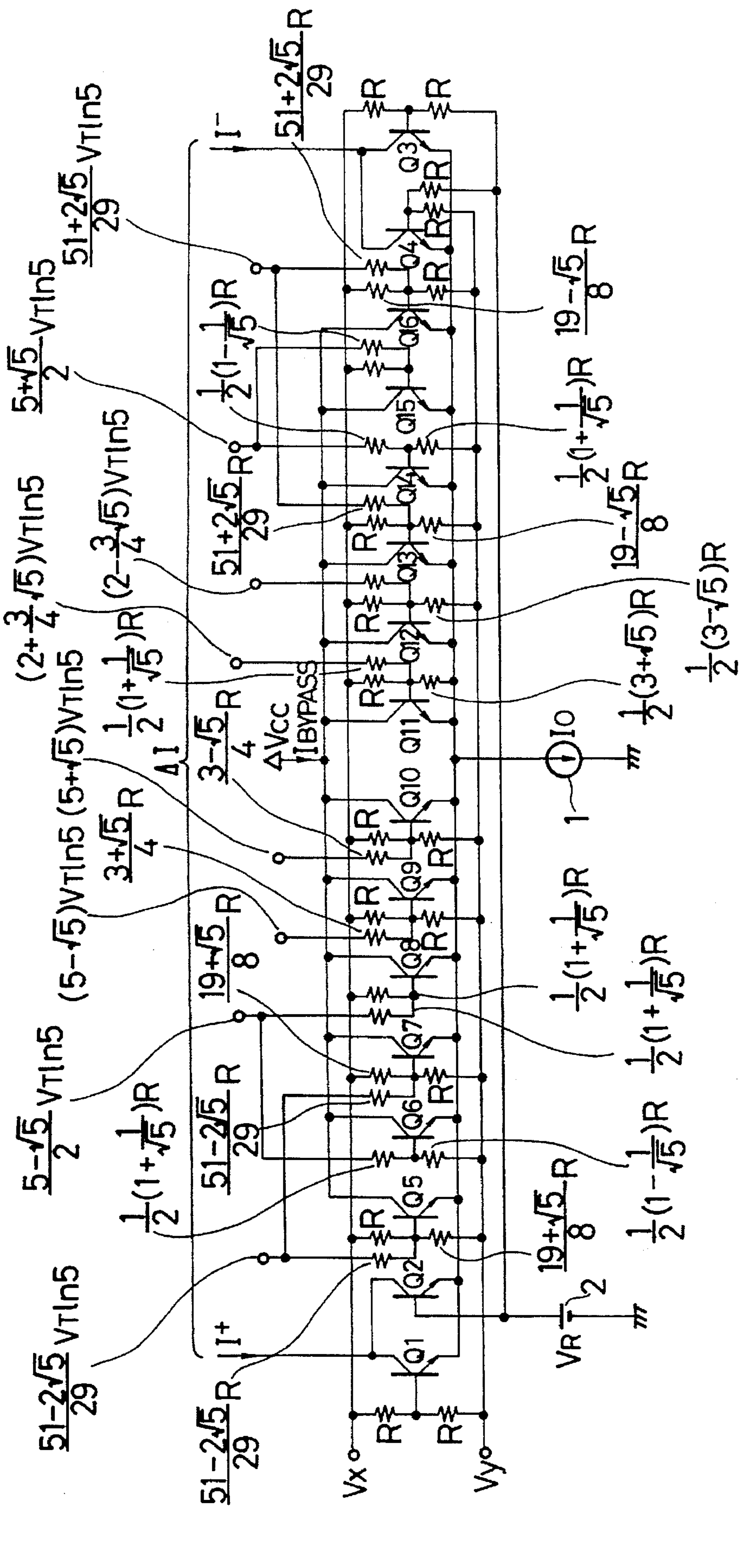
FIG. 27 is a circuit diagram of a bipolar multiplier according to a ninth embodiment of the present invention.

FIG. 27 shows a four-quadrant bipolar multiplier according to a ninth embodiment of the present invention.

This multiplier is obtained by setting the constants a and b to satisfy the relationships of (a−1)>0 and (b−1) >0 in the multiplier according to the seventh embodiment. In this case, the input signal voltages $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, and $V_{16}$ can be all expressed by the sum of the first and second initial input signal voltages $V_x$ and $V_y$. Therefore, these sixteen voltages $V_1$ to $V_{16}$ can be easily realized by resistive dividers.

FIG. 27 shows the simplest structure of the voltage dividing technique using resistors, in which each of the voltages $V_1$ to $V_{16}$ is obtained by division of the sum of the voltage $V_x$ and $V_y$ using resistors.

TENTH EMBODIMENT

Figure 28:
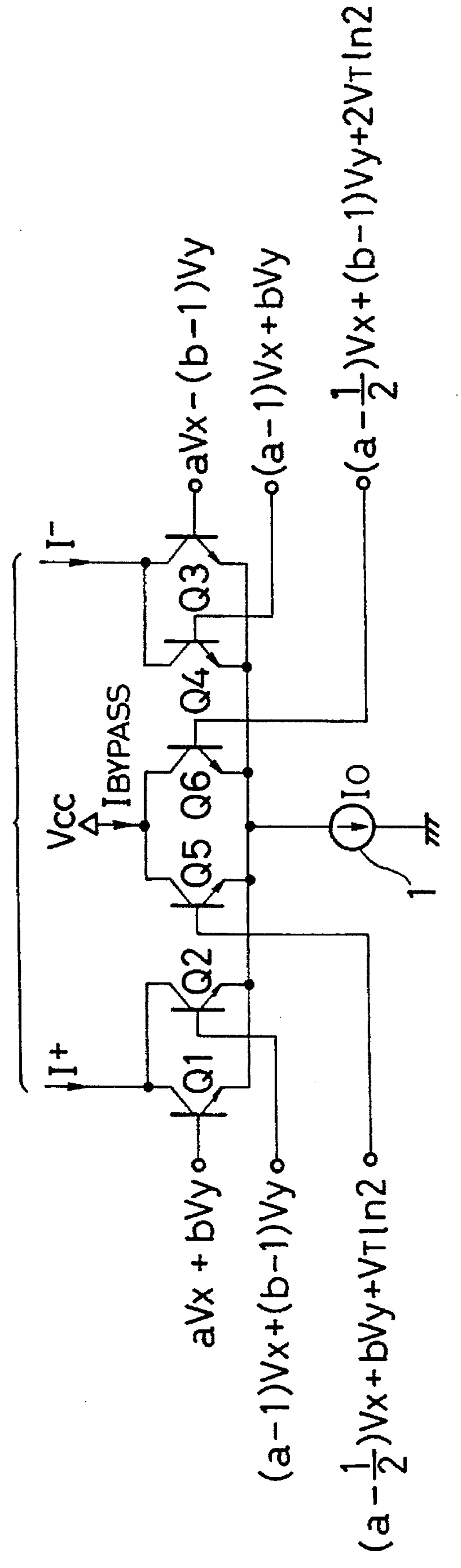
FIG. 28 is a circuit diagram of a bipolar multiplier according to a tenth embodiment of the present invention.

FIG. 28 shows a four-quadrant bipolar multiplier according to a tenth embodiment of the present invention.

As shown in FIG. 28, this multiplier has a multitail cell made of a first transistor pair of npn-type bipolar transistors Q1 and Q2, a second transistor pair of npn-type bipolar transistors Q3 and Q4, and two npn-type bipolar transistors Q5 and Q6. The six transistors Q1 to Q6 have the same emitter area. Unlike the multipliers according to the first to ninth embodiments, this multiplier is of an asymmetrical input type.

If the symmetry of the inputs is not important or critical, the number of bipolar transistors required for the multitail cell can be decreased, one example of which is this embodiment.

In the bipolar multiplier with the asymmetric inputs, the transfer function is composed on the basis of the product of the two transfer functions for such different cells as a longtail cell and a triple-tail cell, a longtail cell and a quadritail cell, and a triple-tail cell and a quadritail cell.

Emitters of the transistors Q1, Q2, Q3, Q4, Q5 and Q6 are coupled together to be connected to one end of a constant current source 1 (current value: $I_0$). The other end of the current source 1 is connected to the ground. The multitail cell is driven by a common tail current $I_0$ from the current source 1.

Collectors of the transistors Q1 and Q2 are coupled together to form one of differential output ends of the multiplier. Collectors of the transistors Q3 and Q4 also are coupled together to form the other of the differential output ends of the multiplier.

Collectors of the transistors Q5 and Q6 are coupled together through which a bypass current $I_{BYPASS}$ flows.

A differential output current ΔI of this multiplier is defined as $\Delta I = I^+ - I^-$, where $I^+$ is an output current of the first transistor pair and $I^-$ is an output current of the second transistor pair.

As shown in FIG. 28, this multiplier is equivalent to one composed of the multiplier according to the first aspect in which the two npn-type bipolar transistors Q5 and Q6 are added instead of the transistors Q5. The transistors Q5 and Q6 produce a bypass current $I_{BYPASS}$.

Bases of the transistors Q1, Q2, Q3 and Q4 are respectively applied with the same input signal voltages $V_1$, $V_2$, $V_3$ and $V_4$ as those in the first embodiment.

Bases of the transistors Q5 and Q6 are respectively applied with the following input signal voltages $V_5$ and $V_6$:

$V_5=\{(a-½)V_x+bV_y+2V_c\}$, and $V_6=\{(a-½)V_x+(b-1)V_y+2V_c\}$, where $V_c$VT·ln2.

In this embodiment, the differential output current ΔI can be expressed by the following equation (41), and the bypass current $I_{BYPASS}$ is expressed by the equation (42).

$$\Delta I = \frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+2\right\}\cosh\left(\frac{V_y}{2V_T}\right)} \tag{41}$$

$$\begin{aligned} I_{BYPASS} &= I_{C5}+I_{C6} \\ &= \alpha_F I_0\left[1-\frac{\cosh\left(\frac{V_x}{2V_T}\right)\cosh\left(\frac{V_y}{2V_T}\right)}{\cosh\left(\frac{V_x}{2V_T}\right)+2\cosh\left(\frac{V_y}{2V_T}\right)}\right] \\ &= 2\,\alpha_F I_0\left[\frac{\cosh\left(\frac{V_y}{2V_T}\right)}{\cosh\left(\frac{V_y}{2V_T}\right)+2\cosh\left(\frac{V_y}{2V_T}\right)}\right] \end{aligned} \tag{42}$$

ELEVENTH EMBODIMENT

Figure 29:
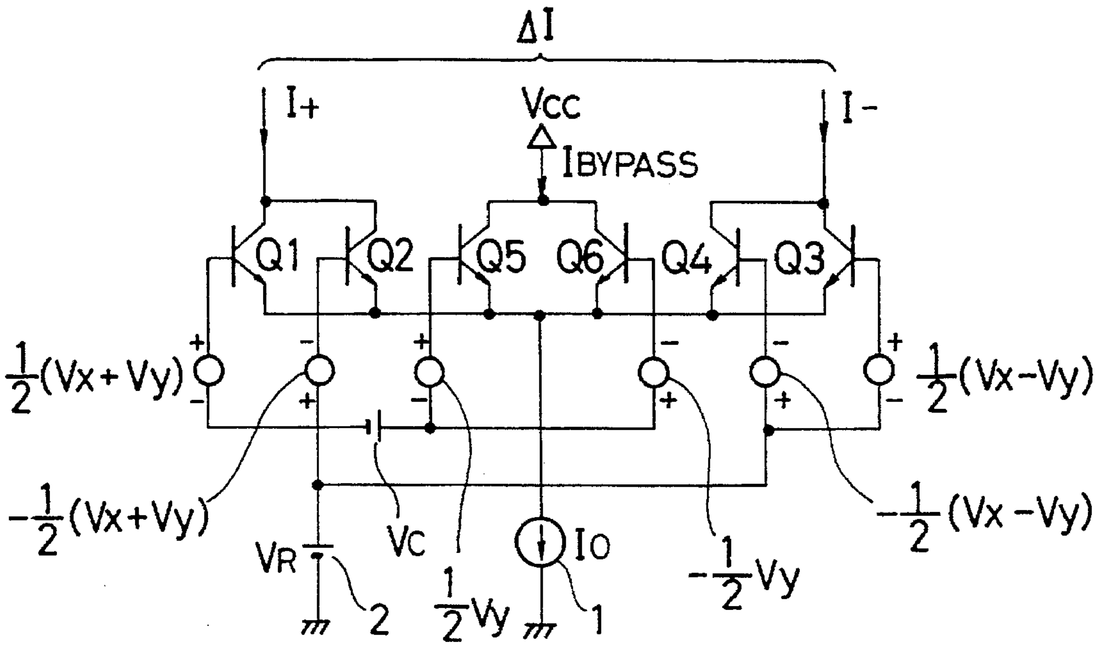
FIG. 29 is a circuit diagram of a bipolar multiplier according to an eleventh embodiment of the present invention.

FIG. 29 shows a four-quadrant bipolar multiplier according to an eleventh embodiment of the present invention.

This multiplier is obtained by setting the constants a and b at a=b=(½) in the multiplier according to the tenth embodiment.

TWELFTH EMBODIMENT

Figure 30:
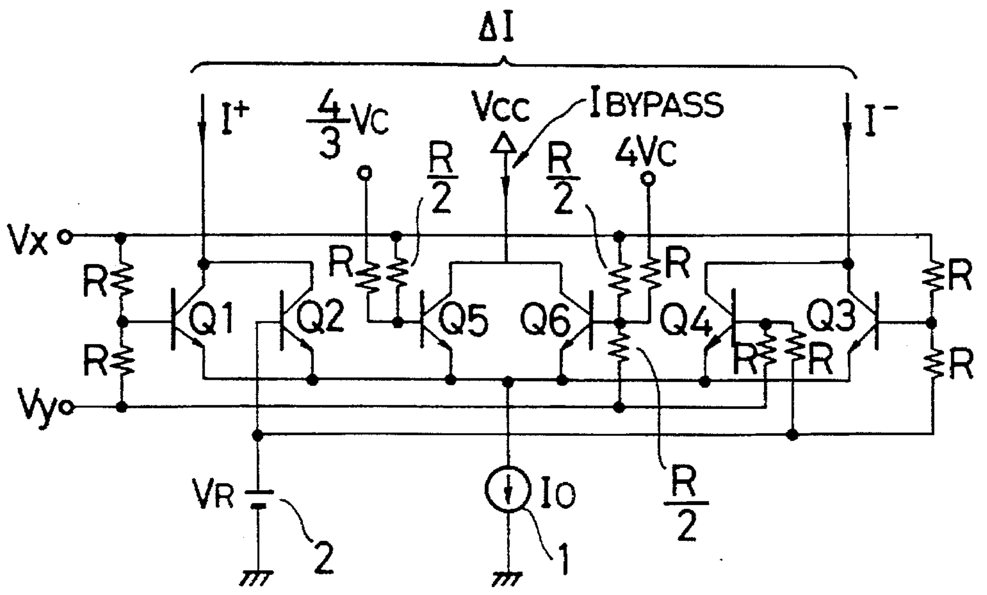
FIG. 30 is a circuit diagram of a bipolar multiplier according to a twelfth embodiment of the present invention.

FIG. 30 shows a four-quadrant bipolar multiplier according to a twelfth embodiment of the present invention.

This multiplier is obtained by setting the constants a and b to satisfy the relationships of (a−1)>0 and (b−1)>0 in the multiplier according to the tenth embodiment. In this case, the input signal voltages $V_1$, $V_2$, $V_3$, $V_4$, $V_5$ and $V_6$ can be all expressed by the sum of the first and second initial input signal voltages $V_x$ and $V_y$. Therefore, these six voltages $V_1$ to $V_6$ can be easily realized by resistive dividers.

FIG. 30 shows the simplest structure of the voltage dividing technique using resistors, in which each of the voltages $V_1$ to $V_6$ is obtained by division of the sum of the voltage $V_x$ and $V_y$ using resistors.

THIRTEENTH EMBODIMENT

Figure 31:
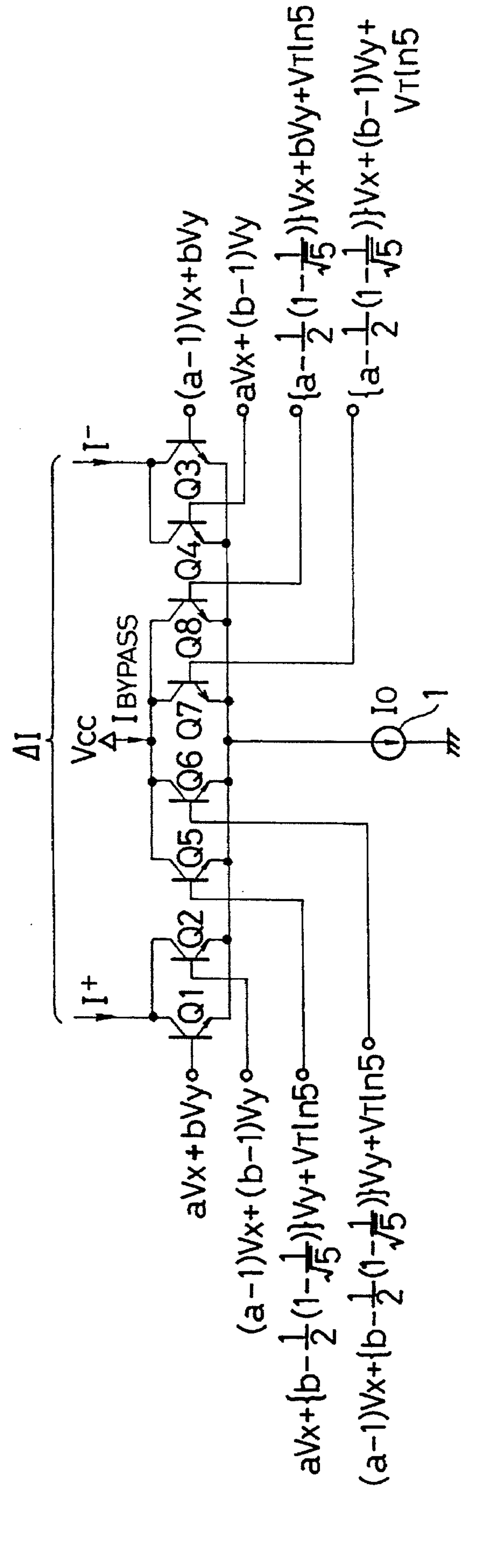
FIG. 31 is a circuit diagram of a bipolar multiplier according to a thirteenth embodiment of the present invention.

FIG. 31 shows a four-quadrant bipolar multiplier according to a thirteenth embodiment of the present invention.

As shown in FIG. 31, this multiplier is equivalent to one composed of the multiplier according to the tenth embodiment and newly added two npn-type bipolar transistors Q7 and Q8. The transistors Q5 to Q8 are utilized for producing a bypass current $I_{BYPASS}$.

The transistors Q5, Q6, Q7 and Q8 have the same emitter area as that of the transistors Q1, Q2, Q3 and Q4. This multiplier is of a symmetrical input type.

Since eight transistors are used as the multitail cell, this multiplier may be termed an "octal-tail cell".

Bases of the transistors Q1, Q2, Q3 and Q4 are respectively applied with the same input signal voltages $V_1$, $V_2$, $V_3$ and $V_4$ as those in the first embodiment.

In this embodiment, the dc voltage $V_c$ is set as $(V_T \cdot \ln 5)$ and therefore, the input signal voltages $V_5$, $V_6$, $V_7$, and $V_8$ applied to the respective transistors Q6, Q7, Q8 and Q9 are $V_5=[aV_x+\{b-(1/2)(1-5^{-1/2})V_y\}+V_T \cdot \ln 5]$, $V_6=[(a-1)V_x+\{b-(1/2)(1-5^{-1/2})V_y\}+V_T \cdot \ln 5]$, $V_7=[\{a-(1/2)(1-5^{-1/2})\}V_x+(b-1)V_y+V_T \cdot \ln 5]$, and $V_8=[\{a-(1/2)(1-5^{-1/2})\}V_x+bV_y+V_T \cdot \ln 5]$, respectively.

The differential output current $\Delta I$ can be expressed by the following equation (43) as $$\Delta I=\frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)} \tag{43}$$

The bypass current $I_{BYPASS}$ can be expressed by the following equation (44) as $$\begin{aligned} I_{BYPASS} &= I_{C5}+I_{C6}+I_{C7}+I_{C8} \\ &= \alpha_F I_0\left[1-\frac{\cosh\left(\frac{V_x}{2V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)}\right] \\ &= 5\alpha_F I_0\left[\frac{\cosh\left(\frac{V_x}{2\sqrt{5}\,V_T}\right)\cosh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\cosh\left(\frac{V_y}{2V_T}\right)}\right] \end{aligned} \tag{44}$$

FOURTEENTH EMBODIMENT

Figure 32:
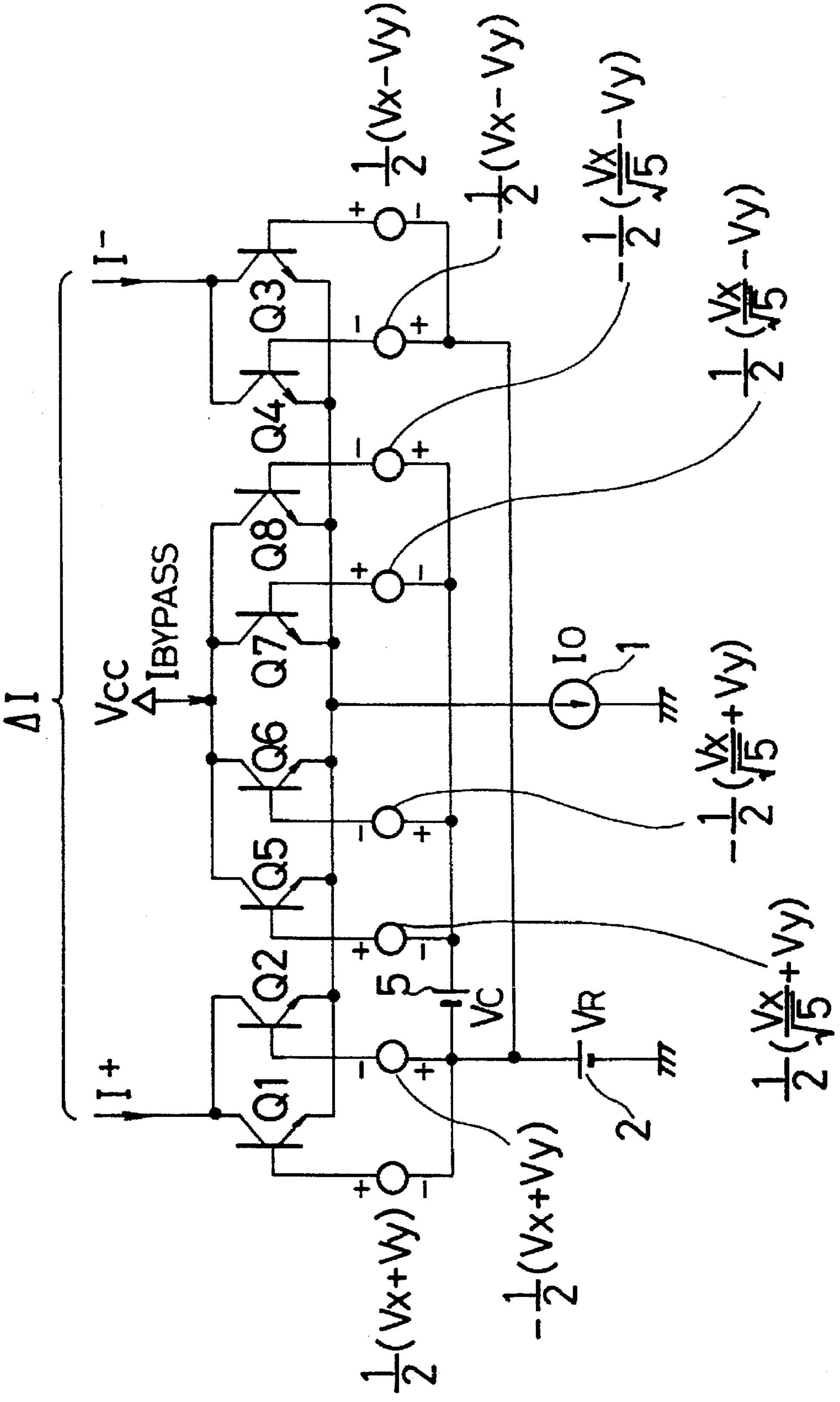
FIG. 32 is a circuit diagram of a bipolar multiplier according to a fourteenth embodiment of the present invention.

FIG. 32 shows a four-quadrant bipolar multiplier according to a fourteenth embodiment of the present invention.

This multiplier is obtained by setting the constants a and b at $a=b=(1/2)$ in the multiplier according to the thirteenth embodiment.

In FIG. 32, the reference numeral 5 indicates a voltage source supplying a dc voltage of $V_c$.

FIFTEENTH EMBODIMENT

Figure 33:
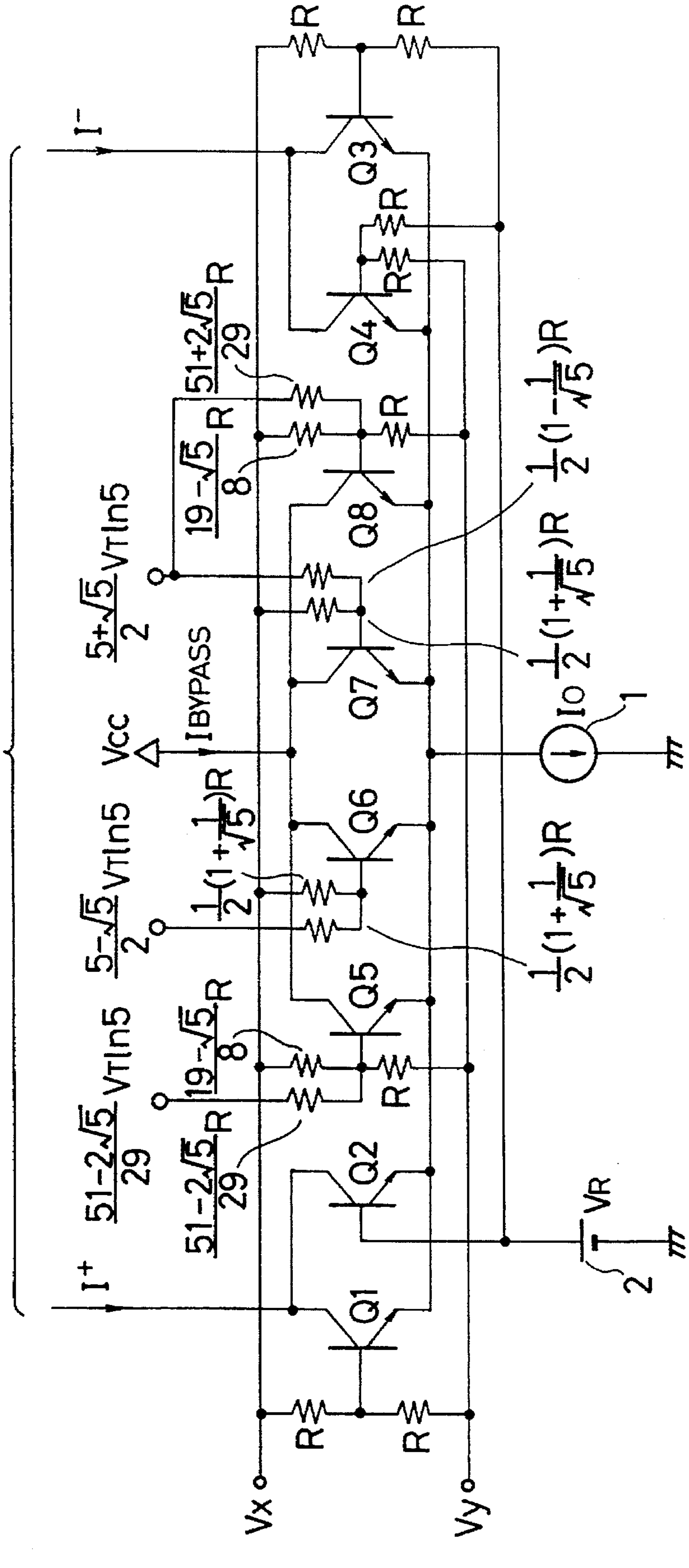
FIG. 33 is a circuit diagram of a bipolar multiplier according to a fifteenth embodiment of the present invention.

FIG. 33 shows a four-quadrant bipolar multiplier according to a fifteenth embodiment of the present invention.

This multiplier is obtained by setting the constants a and b to satisfy the relationships of $(a-1)>0$, $(b-1)>0$, $\{a-(1/2)(1-5^{-1/2})\}>0$, and $\{b-(1/2)(1-5^{-1/2})\}>0$.

in the multiplier according to the thirteenth embodiment. In this case, the input signal voltages $V_1$, $V_2$, $V_3$, $V_4$, $V_5$, $V_6$, $V_7$ and $V_8$ can be all expressed by the sum of the first and second initial input signal voltages $V_x$ and $V_y$. Therefore, these six voltages $V_1$ to $V_8$ can be easily realized by resistive dividers.

FIG. 33 shows the simplest structure of the voltage dividing technique using resistors, in which each of the voltages $V_1$ to $V_8$ is obtained by division of the sum of the voltage $V_x$ and $V_y$ using resistors.

SIXTEENTH EMBODIMENT

Figure 34:
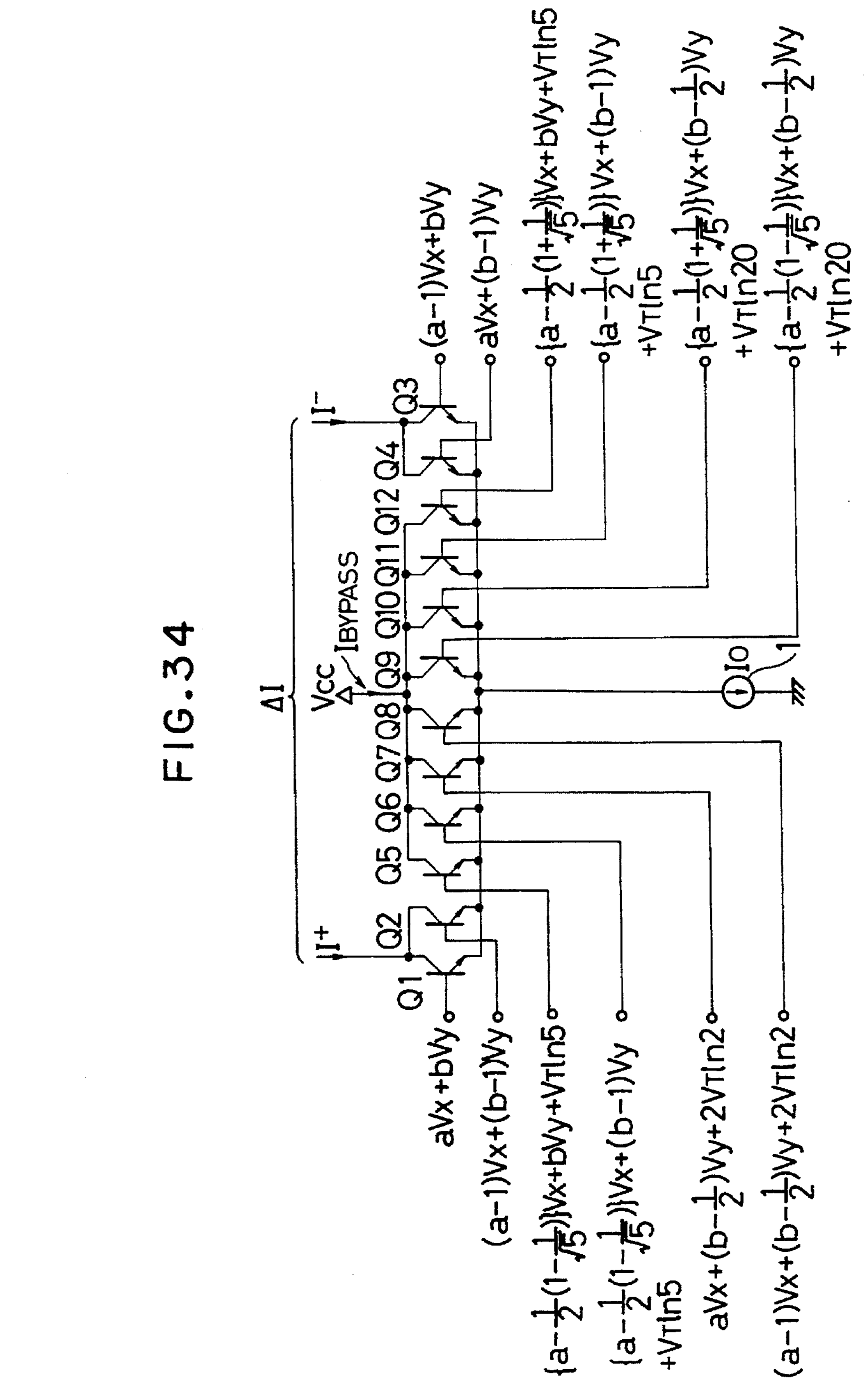
FIG. 34 is a circuit diagram of a bipolar multiplier according to a sixteenth embodiment of the present invention.

FIG. 34 shows a four-quadrant bipolar multiplier according to a sixeenth embodiment of the present invention.

As shown in FIG. 34, this multiplier is equivalent to one composed of the multiplier according to the thirteenth embodiment and newly added four npn-type bipolar transistors Q9, Q10, Q11 and Q12. The transistors Q5 to Q12 are utilized for producing a bypass current $I_{BYPASS}$.

The transistors Q9, Q10, Q11 and Q12 have the same emitter area as that of the transistors Q1, Q2, Q3, Q4, Q5, Q6, Q7 and Q8. This multiplier is of an asymmetrical input type.

Bases of the transistors Q1, Q2, Q3 and Q4 are respectively applied with the same input signal voltages $V_1$, $V_2$, $V_3$ and $V_4$ as those in the first embodiment.

In this embodiment, the input signal voltages $V_5$, $V_6$, $V_7$, $V_8$, $V_9$, $V_{10}$, $V_{11}$ and $V_{12}$ applied to the respective transistors Q5 to Q12 are as follows:

$V_5=[\{a-(1/2)(1-5^{-1/2})\}V_x+bV_y+V_T \cdot \ln 5]$ $V_6=[\{a-(1/2)(1-5^{-1/2})\}V_x+\{b-1\}V_y+V_T \cdot \ln 5]$;

$V_7=[aV_x+\{b-(1/2)\}V_y+2V_T \cdot \ln 2]$;

$V_8=(a-1)V_x+\{b+(1/2)\}V_y+2V_T \cdot \ln 2]$;

$V_9=[\{a-(1/2)(1-5^{-1/2})\}V_x+\{b-(1/2)\}V_y+V_T \cdot \ln 20]$ $V_{10}=[\{a-(1/2)(1+5^{-1/2})\}V_x+\{b-(1/2)\}V_y+V_T \cdot \ln 20]$, $V_{11}=[\{a-(1/2)(1+5^{-1/2})\}V_x+\{b-(1/2)\}V_y+V_T \cdot \ln 5]$; and $V_{12}=[\{a-(1/2)(1+5^{-1/2})\}V_x+bV_y+V_T \cdot \ln 5]$.

The differential current $\Delta I$ can be expressed by the following equation (45) as $$\Delta I=\frac{\alpha_F I_0 \sinh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\left\{\cosh\left(\frac{V_y}{2V_T}\right)+2\right\}} \tag{45}$$

The bypass current $I_{BYPASS}$ can be expressed by the following equation (46) as $$I_{BYPASS} = I_{C5}+I_{C6}+I_{C7}+I_{C8}+I_{C9} \tag{46}$$

$$= \alpha_F I_0 \left[ 1 - \frac{\cosh\left(\frac{V_x}{2V_T}\right)\sinh\left(\frac{V_y}{2V_T}\right)}{\left\{\cosh\left(\frac{V_x}{2V_T}\right)+5\cosh\left(\frac{V_x}{2\sqrt{5}\,V_T}\right)\right\}\left\{\cosh\left(\frac{V_y}{2V_T}\right)+2\right\}} \right]$$

SEVENTEENTH EMBODIMENT

Figure 35:
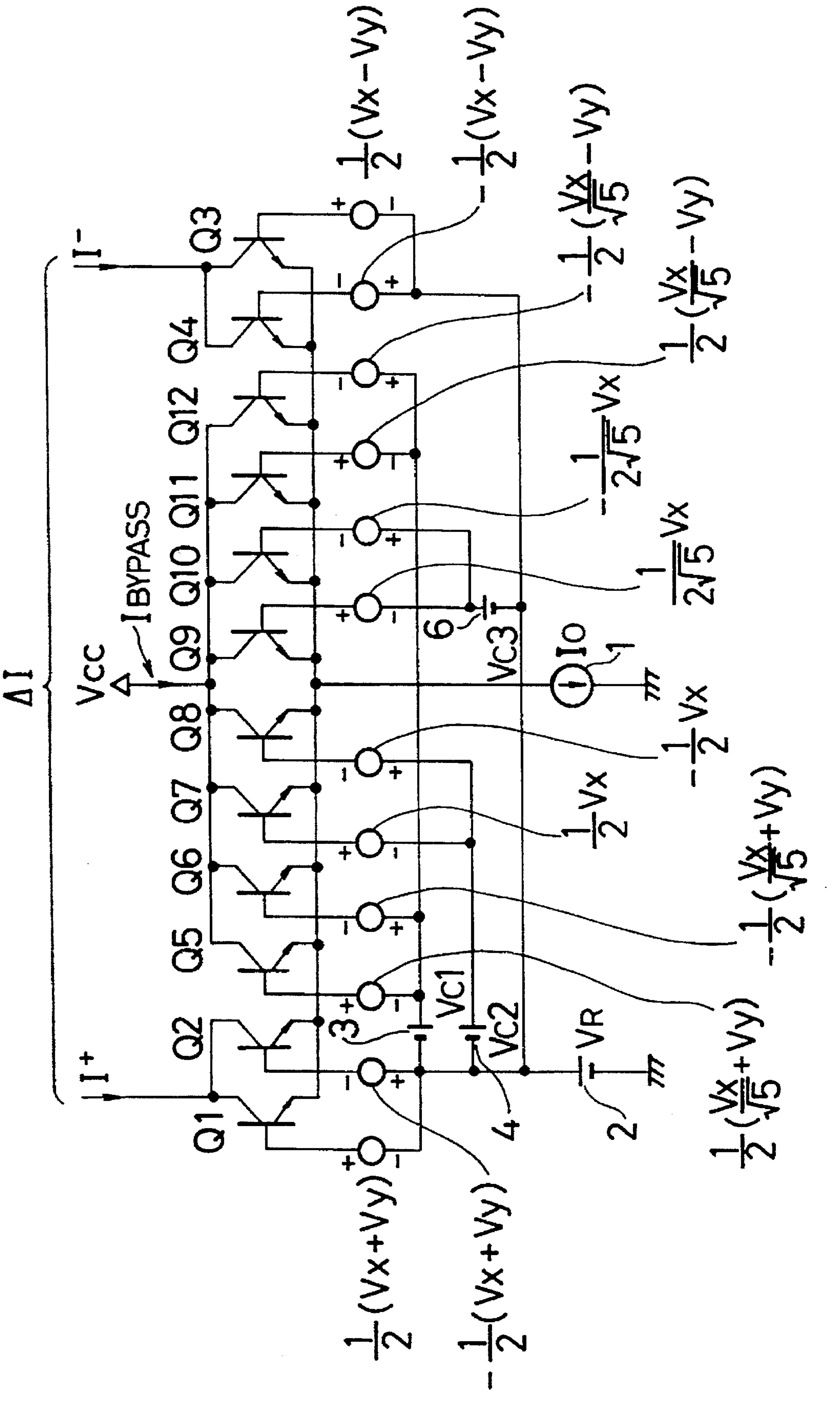
FIG. 35 is a circuit diagram of a bipolar multiplier according to a seventeenth embodiment of the present invention.

FIG. 35 shows a four-quadrant bipolar multiplier according to a seventeenth embodiment of the present invention.

This multiplier is obtained by setting the constants a and b at a=b=(½) in the multiplier according to the sixteenth embodiment.

In FIG. 35, the reference numeral 2, 3 and 6 indicate voltage sources supplying dc voltages of $V_{c1}$, $V_{c2}$ and $V_{c3}$, respectively.

EIGHTEENTH EMBODIMENT

Figure 36:
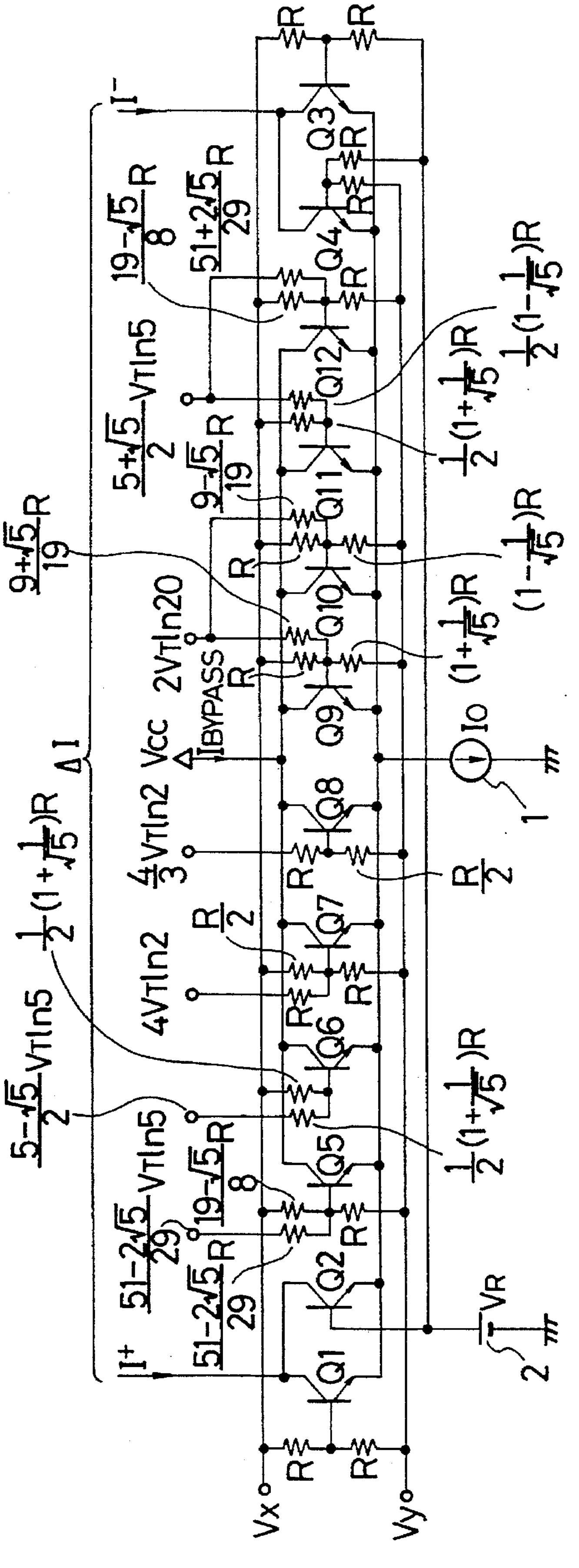
FIG. 36 is a circuit diagram of a bipolar multiplier according to an eighteenth embodiment of the present invention.

FIG. 36 shows a four-quadrant bipolar multiplier according to an eighteenth embodiment of the present invention.

This multiplier is obtained by setting the constants a and b to satisfy the relationships of (a−1)>0, (b−1)>0, and $\{a-(½)(1+5^{-½})\}>0$ in the multiplier according to the sixteenth embodiment. In this case, the input signal voltages $V_1$, $V_2$, $V_3$, $V_4$, $V_5$, $V_6$, $V_7$, $V_8$, $V_9$, $V_{10}$, $V_{11}$ and $V_{12}$ can be all expressed by the sum of the first and second initial input signal voltages $V_x$ and $V_y$. Therefore, these twelve voltages $V_1$ to $V_{12}$ can be easily realized by resistive dividers.

FIG. 36 shows the simplest structure of the voltage dividing technique using resistors, in which each of the voltages $V_1$ to $V_{12}$ is obtained by division of the sum of the voltage $V_x$ and $V_y$ using resistors.

As described above, with the present invention having the multitail cell configuration, the number of bipolar transistors can be changed, depending upon such factors as whether the inputs are to be of symmetrical type or asymmetrical one, and the desired degree of input linearization by the bypass current. Thus, a variety of bipolar multipliers that can be operated at a low voltage such as 1 V are provided, which is because the transistors are not vertically stacked. At the same time, these multipliers can have an enlarged input voltage range providing a good linearity.

The mutitail cell may be composed of a first transistor pair of two bipolar transistors whose output ends are coupled together, a second transistor pair of two bipolar transistors whose output ends are coupled together, and at least one additional bipolar transistor. Accordingly, the number of the additional bipolar transistor is optionally decided dependent upon the necessary performance of the multiplier.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $\{a-(½)\}V_x+\{b-(½)\}V_y+V_c$, where $V_c$ is a positive dc voltage; and (d) said first transistor pair, said second transistor pair, and said fifth bipolar transistor being driven by a common tail current, thereby forming a multitail cell:

(e) wherein the multiplication result $V_x \cdot V_y$ of said first initial input signal $V_x$ and said second initial input signal $V_y$ is differentially output from said differential output ends.

2. A bipolar multiplier as claimed in claim 1, wherein the value of said positive dc voltage $V_c$ is equal to $(V_T \cdot \ln 2)$, where $V_T$ is the thermal voltage.

3. A bipolar multiplier as claimed in claim 1, wherein said constant a and said constant b satisfy the relationships of (a−1)>0 and (b−1)>0, respectively.

4. A bipolar multiplier as claimed in claim 1, wherein said constant a and said constant b satisfy the relationships of a=1 and b=1.

5. A bipolar multiplier as claimed in claim 1, wherein said first input signal, said second input signal, said third input signal, said fourth input signal, and said fifth input signal are produced by using resistive dividers, respectively.

6. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $\{a-(½)\}V_x+\{b-(½)\}V_y+4V_T\cdot\ln2$, where $V_c$ is a positive dc voltage;

(d) a sixth bipolar transistor having an input end and an output end;

said input end of said sixth transistor being applied with a sixth input signal of $aV_x+\{b-(½)\}V_y+2V_T\cdot\ln2$;

(e) a seventh bipolar transistor having an input end and an output end;

said input end of said seventh transistor being applied with a seventh input signal of $(a-1)V_x+\{b-(½)\}V_y+2V_T\cdot\ln2$;

(f) an eighth bipolar transistor having an input end and an output end;

said input end of said eighth transistor being applied with an eighth input signal of $\{a-(½)\}V_x+bV_y+2V_T\cdot\ln2$; and (g) a ninth bipolar transistor having an input end and an output end;

said input end of said ninth transistor being applied with a ninth input signal of $\{a-(½)\}V_x+(b-1)V_y+2V_T\cdot\ln2$;

(h) said output ends of said fifth bipolar transistor, said sixth bipolar transistor, said seventh bipolar transistor, said eighth bipolar transistor, and said ninth bipolar transistor being coupled together:

(i) said first transistor pair, said second transistor pair, said fifth bipolar transistor, said sixth bipolar transistor, said seventh bipolar transistor, said eighth bipolar transistor, and said ninth bipolar transistor being driven by a common tail current, thereby forming a multitail cell:

(j) wherein the multiplication result $V_x \cdot V_y$ of said first initial input signal $V_x$ and said second initial input signal $V_y$ is differentially output from said differential output ends.

7. A bipolar multiplier as claimed in claim 6, wherein said constants a and b satisfy the relationships of $(a-1)>0$ and $(b-1)>0$.

8. A bipolar multiplier as claimed in claim 6, wherein said constants a and b satisfy the relationships of $a=1$ and $b=1$.

9. A bipolar multiplier as claimed in claim 6, wherein said first input signal, said second input signal, said third input signal, and said fourth input signal are produced by dividing said first initial input sinal and said second initial input signal by resistive dividers, respectively.

10. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $aV_x+\{b-(½)(1-5^{-½})\}V_y+V_c$, where $V_c$ is a positive dc voltage;

(d) a sixth bipolar transistor having an input end and an output end;

said input end of said sixth transistor being applied with a sixth input signal of $(a-1)V_x+\{b-(½)(1-5^{-½})\}V_y+V_c$;

(e) a seventh bipolar transistor having an input end and an output end;

said input end of said seventh transistor being applied with a seventh input signal of $\{a-(½)(1-5^{-½})\}V_x+bV_y+V_c$;

(f) an eighth bipolar transistor having an input end and an output end;

said input end of said eighth transistor being applied with an eighth input signal of $\{a-(½)(1-5^{-½})\}V_x+(b-1)V_y+V_c$;

(g) a ninth bipolar transistor having an input end and an output end;

said input end of said ninth transistor being applied with a ninth input signal of $\{a-(½)(1-5^{-½})\}V_x+\{b-(½)(1-5^{-½})\}V_y+2V_c$;

(h) a tenth bipolar transistor having an input end and an output end;

said input end of said tenth transistor being applied with a tenth input signal of $\{a-(½)(1+5^{-½})\}V_x+\{b-(½)(1+5^{-½}))\ V_y+2V_c$;

(i) an eleventh bipolar transistor having an input end and an output end;

said input end of said eleventh transistor being applied with an eleventh input signal of $\{a-(½)(1-5^{-½})\}V_x+\{b-(½)(1+5^{-½})\}V_y+2V_c$;

(j) a twelfth bipolar transistor having an input end and an output end;

said input end of said twelfth transistor being applied with a twelfth input signal of $\{a-(½)(1+5^{-2/1})\}V_x+\{b-(½)(1-5^{-½})\}V_y+2V_c$;

(k) a thirteenth bipolar transistor having an input end and an output end;

said input end of said thirteenth transistor being applied with a thirteenth input signal of $aV_x+\{b-(½)(1+5^{-½})\}V_y+V_c$;

(l) a fourteenth bipolar transistor having an input end and an output end;

said input end of said fourteenth transistor being applied with a fourteenth input signal of $(a-1)V_x+(b-(½)(1-5^{-½}))\ V_y+V_c$;

(m) a fifteenth bipolar transistor having an input end and an output end;

said input end of said fifteenth transistor being applied with a fifteenth input signal of $\{a-(½)(1+5^{-½})\}V_x+(b-1)V_y+V_c$; and (n) a sixteenth bipolar transistor having an input end and an output end;

said input end of said sixteenth transistor being applied with a sixteenth input signal of $\{a-(½)(1+5^{-½})\}V_x+bV_y+V_c$;

(o) said output ends of said fifth bipolar transistor, said sixth bipolar transistor, said seventh bipolar transistor, said eighth bipolar transistor, said ninth bipolar transistor, said tenth bipolar transistor, said eleventh bipolar transistor, said twelfth bipolar transistor, said thirteenth bipolar transistor, said fourteenth bipolar transistor, said fifteenth bipolar transistor, and said sixteenth bipolar transistor being coupled together:

(p) said first transistor pair, said second transistor pair, said fifth bipolar transistor, said sixth bipolar transistor, said seventh bipolar transistor, said eighth bipolar transistor, said ninth bipolar transistor, said tenth bipolar transistor, said eleventh bipolar transistor, said twelfth bipolar transistor, said thirteenth bipolar transistor, said fourteenth bipolar transistor, said fifteenth bipolar transistor, and said sixteenth bipolar transistor being driven by a common tail current, thereby forming a multitail cell:

(q) wherein the multiplication result $V_x \cdot V_y$ of said first initial input signal $V_x$ and said second initial input signal $V_y$ is differentially output from said differential output ends.

11. A bipolar multiplier as claimed in claim 10, wherein the value of said positive dc voltage $V_c$ is equal to ($V_T$·ln5), where $V_T$ is the thermal voltage.

12. A bipolar multiplier as claimed in claim 10, wherein said constants a and b satisfy the relationships of $(a-1)>0$, $(b-1)>0$, $\{a-(½)(1+5^{-½})\}>0$, and $\{b-(½)(1+5^{-½})\}>0$.

13. A bipolar multiplier as claimed in claim 10, wherein said constants a and b satisfy the relationships of a=1 and b=1.

14. A bipolar multiplier as claimed in claim 10, wherein said first input signal, said second input signal, said third input signal, said fourth input signal, said fifth input signal, said sixth input signal, said seventh input signal, said eighth input signal, said ninth input signal, said eighth input signal, said ninth input signal, said tenth input signal, said eleventh input signal, said twelfth input signal, said thirteenth input signal, said fourteenth input signal, said fifteenth input signal, and said sixteenth input signal are produced by using resistive dividers, respectively.

15. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $\{(a-(½)\}V_x+bV_y+2V_c$, where $V_c$ is a positive dc voltage;

(d) a sixth bipolar transistor having an input end and an output end;

said input end of said sixth bipolar transistor being applied with a sixth input signal of $\{a-(½)\}V_x+b-1)V_y+2V_c$;

said output end of said sixth bipolar transistor is connected to said output end of said fifth bipolar transistor;

(e) said first transistor pair, said second transistor pair, said fifth bipolar transistor, and said sixth bipolar transistor being driven by a common tail current, thereby forming a multitail cell:

(f) wherein the multiplication result $V_x \cdot V_y$ of said first initial input signal $V_x$ and said second initial input signal $V_y$ is differentially output from said differential output ends.

16. A bipolar multiplier as claimed in claim 15, wherein the value of said positive dc voltage $V_c$ is equal to ($V_T$·ln2), where $V_T$ is the thermal voltage.

17. A bipolar multiplier as claimed in claim 15, wherein said constant a and said constant b satisfy the relationships of $(a-1)>0$ and $(b-1)>0$, respectively.

18. A bipolar multiplier as claimed in claim 15, wherein said constant a and said constant b satisfy the relationships of a=1 and b=1.

19. A bipolar multiplier as claimed in claim 15, wherein said first input signal, said second input signal, said third input signal, said fourth input signal, said fifth input signal, and said sixth input signal are produced by using resistive dividers, respectively.

20. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $aV_x+\{b-(1/2)(1-5^{-1/2})V_y\}+V_c$ where $V_c$ is a positive dc voltage;

(d) a sixth bipolar transistor having an input end and an output end;

said input end of said sixth bipolar transistor being applied with a sixth input signal of $(a-1)V_x+\{b-(1/2)(1-5^{-1/2})V_y\}+V_c$;

(e) a seventh bipolar transistor having an input end and an output end;

said input end of said seventh bipolar transistor being applied with a seventh input signal of $\{a-(1/2)(1-5^{-1/2})\}V_x+(b-1)V_y+V_c$;

(f) an eighth bipolar transistor having an input end and an output end;

said input end of said eighth bipolar transistor being applied with an eighth input signal of $\{a-(1/2)(1-5^{-1/2})\}V_x+bV_y+V_c$;

(g) said output ends of said fifth bipolar transistor, said sixth bipolar transistor, said seventh bipolar transistor, and said eighth bipolar transistor being coupled together;

(h) said first transistor pair, said second transistor pair, said fifth bipolar transistor, said sixth bipolar transistor, said seventh bipolar transistor, and said eighth bipolar transistor being driven by a common tail current, thereby forming a multitail cell;

(i) wherein the multiplication result $V_x \cdot V_y$ of said first initial input signal $V_x$ and said second initial input signal $V_y$ is differentially output from said differential output ends.

21. A bipolar multiplier as claimed in claim 20, wherein the value of said positive dc voltage $V_c$ is equal to $(V_T \ln 5)$, where $V_T$ is the thermal voltage.

22. A bipolar multiplier as claimed in claim 20, wherein said constant a and said constant b satisfy the relationships of $(a-1)>0$, $(b-1)>0$, $\{a-(1/2)(1-5^{-1/2})\}>0$, and $\{b-(1/2)(1-5^{-1/2})\}>0$, respectively.

23. A bipolar multiplier as claimed in claim 20, wherein said constants a and b satisfy the relationships of a=1 and b=1.

24. A bipolar multiplier as claimed in claim 20, wherein said first input signal, said second input signal, said third input signal, said fourth input signal, said fifth input signal, said sixth input signal, said seventh input signal, and said eighth input signal are produced by using resistive dividers, respectively.

25. A bipolar multiplier for multiplying a first initial input signal $V_x$ and a second initial input signal $V_y$, said multiplier comprising:

(a) a first transistor pair of a first bipolar transistor having an input end and an output end and a second bipolar transistor having an input end and an output end;

said output ends of said first bipolar transistor and said second bipolar transistor being coupled together, thereby forming one of differential output ends of said multiplier;

said input end of said first bipolar transistor being applied with a first input signal of $(aV_x+bV_y)$, where a and b are constants;

said input end of said second bipolar transistor being applied with a second input signal of $(a-1)V_x+(b-1)V_y$;

(b) a second transistor pair of a third bipolar transistor having an input end and an output end and a fourth bipolar transistor having an input end and an output end;

said output ends of said third bipolar transistor and said fourth bipolar transistor being coupled together, thereby forming the other of said differential output ends of said multiplier;

said input end of said third bipolar transistor being applied with a third input signal of $(a-1)V_x+bV_y$;

said input end of said fourth bipolar transistor being applied with a fourth input signal of $aV_x+(b-1)V_y$; and (c) a fifth bipolar transistor having an input end and an output end;

said input end of said fifth bipolar transistor being applied with a fifth input signal of $\{a-(1/2)(1-5^{-1/2})\}V_x+bV_y+V_{c2}$, where $V_{c2}$ is a positive dc voltage;

(d) a sixth bipolar transistor having an input end and an output end;

said input end of said sixth transistor being applied with a sixth input signal of $\{a-(1/2)(1-5^{-1/2})\}V_x+\{b-1\}V_y+V_{c2}$;

(e) a seventh bipolar transistor having an input end and an output end;

said input end of said seventh transistor being applied with a seventh input signal of $aV_x+\{b-(1/2)\}V_y+V_{c1}$, where $V_{c1}$ is a positive dc voltage;

(f) an eighth bipolar transistor having an input end and an output end;

said input end of said eighth transistor being applied with an eighth input signal of $(a-1)V_x+\{b-(1/2)\}V_y+V_{c1}$;

(g) a ninth bipolar transistor having an input end and an output end;

said input end of said ninth transistor being applied with a ninth input signal of $\{a-(1/2)(1-5^{-1/2})\}V_x+\{b-(1/2)\}V_y+V_{c3}$, where $V_{c3}$ is a positive dc voltage;

(h) a tenth bipolar transistor having an input end and an output end;

said input end of said tenth transistor being applied with a tenth input signal of $\{a-(1/2)(1+5^{-1/2})\}V_x+\{b-(1/2)\}V_y+V_{c3}$;

(i) an eleventh bipolar transistor having an input end and an output end;

said input end of said eleventh transistor being applied with an eleventh input signal of $\{a-(1/2)(1+5^{-1/2})\}V_x+\{b-(1/2)\}V_y+V_{c3}$;

(j) a twelfth bipolar transistor having an input end and an output end;

said input end of said twelfth transistor being applied with a twelfth input signal of $\{a-(1/2)(1+5^{-1/2})\}V_x+bV_y+V_{c2}$;

(k) said output ends of said fifth bipolar transistor, said sixth bipolar transistor, said seventh bipolar transistor, said eighth bipolar transistor, said ninth bipolar transistor, said tenth bipolar transistor, said eleventh bipolar transistor, and said twelfth bipolar transistor being coupled together;

(l) said first transistor pair, said second transistor pair, said fifth bipolar transistor, said sixth bipolar transistor, said seventh bipolar transistor, said eighth bipolar transistor, said ninth bipolar transistor, said tenth bipolar transistor, said eleventh bipolar transistor, and said twelfth bipolar transistor being driven by a common tail current, thereby forming a multitail cell;

(m) wherein the multiplication result $V_x \cdot V_y$ of said first initial input signal $V_x$ and said second initial input signal $V_y$ is differentially output from said differential output ends.

26. A bipolar multiplier as claimed in claim 25, wherein the value of said positive dc voltages $V_{C1}$, $V_{C2}$ and $V_{C3}$ are equal to $(V_T \cdot \ln 2)$, $(V_T \cdot \ln 5)$ and $(V_T \cdot \ln 20)$, where $V_T$ is the thermal voltage, respectively.

27. A bipolar multiplier as claimed in claim 25, wherein said constant a and said constant b satisfy the relationships of $(a-1)>0$, $(b-1)>0$, and $\{a-(1/2)(1+5^{-1/2})\}>0$, respectively.

28. A bipolar multiplier as claimed in claim 25, wherein said constants a and b satisfy the relationships of a=1 and b=1.

29. A bipolar multiplier as claimed in claim 25, wherein said first input signal, said second input signal, said third input signal, said fourth input signal, said fifth input signal, said sixth input signal, said seventh input signal, said eighth input signal, said ninth input signal, said tenth input signal, said eleventh input signal, and said twelfth input signal are produced by using resistive dividers, respectively.

* * * * *

UNITED STATES PATENT AND TRADEMARK OFFICE
CERTIFICATE OF CORRECTION

PATENT NO. : 5,668,750
DATED : September 16, 1997
INVENTOR(S) : Katsuji KIMURA

It is certified that error(s) appears in the above-identified patent and that said Letters Patent is hereby corrected as shown below:

Column 3, line 15, delete "linearire" and insert --linearize--.

Column 6, lines 11-12, "$-5^{-1/2})$" should read --$5^{-1/2})\}Vx+\{b-(1/2)$--

Column 6, line 24, delete "end" and insert --and--.

Column 6, in equation 38, delete "$\left(\frac{Y_y}{2\sqrt{5}V_T}\right)$" and insert --$\left(\frac{V_y}{2\sqrt{5}V_T}\right)$--.

Column 6, in equation 40, delete "$\left(\frac{Y_y}{2\sqrt{5}V_T}\right)$" and insert --$\left(\frac{V_y}{2\sqrt{5}V_T}\right)$--.

Column 20, line 4, delete "sinh" and insert --cosh--.

Signed and Sealed this

Third Day of March, 1998

Attest:

Bruce Lehman

BRUCE LEHMAN

*Attesting Officer* *Commissioner of Patents and Trademarks*